(12) United States Patent
Weeks

(10) Patent No.: US 10,676,324 B2
(45) Date of Patent: Jun. 9, 2020

(54) PLUG AND PLAY TOOL CONNECTION

(71) Applicant: Thomas A Weeks, Beckley, WV (US)

(72) Inventor: Thomas A Weeks, Beckley, WV (US)

( * ) Notice: Subject to any disclaimer, the term of this patent is extended or adjusted under 35 U.S.C. 154(b) by 416 days.

(21) Appl. No.: 15/867,751

(22) Filed: Jan. 11, 2018

(65) Prior Publication Data

US 2018/0251345 A1 Sep. 6, 2018

Related U.S. Application Data

(60) Provisional application No. 62/467,147, filed on Mar. 5, 2017.

(51) Int. Cl.
| | |
|---|---|
| *B66C 1/68* | (2006.01) |
| *H01R 13/627* | (2006.01) |
| *H01R 13/631* | (2006.01) |
| *H01R 27/02* | (2006.01) |
| *B66F 9/12* | (2006.01) |
| *F16B 2/10* | (2006.01) |
| *E02F 3/96* | (2006.01) |
| *B66F 9/065* | (2006.01) |
| *H01R 13/635* | (2006.01) |

(Continued)

(52) U.S. Cl.
CPC ............... *B66C 1/68* (2013.01); *B66C 13/14* (2013.01); *B66F 9/0655* (2013.01); *B66F 9/12* (2013.01); *B66F 9/205* (2013.01); *E02F 3/306* (2013.01); *E02F 3/3618* (2013.01); *E02F 3/3622* (2013.01); *E02F 3/3654* (2013.01); *E02F 3/3681* (2013.01); *E02F 3/96* (2013.01); *F16B 2/10* (2013.01); *H01R 13/6271* (2013.01); *H01R 13/6275* (2013.01); *H01R 13/631* (2013.01); *H01R 13/635* (2013.01); *H01R 27/02* (2013.01)

(58) Field of Classification Search
CPC ..... E02F 3/3663; E02F 3/3654; E02F 3/3627; E02F 9/205; E02F 9/2275; F16L 37/56; B66F 9/12; B66F 9/205
See application file for complete search history.

(56) References Cited

U.S. PATENT DOCUMENTS

| | | |
|---|---|---|
| 2,788,991 A | 4/1957 | Neuhauser |
| 2,963,183 A | 12/1960 | Przybylski |

(Continued)

FOREIGN PATENT DOCUMENTS

| | | |
|---|---|---|
| EP | 288744 B1 | 7/1992 |
| EP | 2712836 A1 | 4/2014 |

*Primary Examiner* — Daniel J Wiley
(74) *Attorney, Agent, or Firm* — Dinsmore & Shohl LLP; Monika L'Orsa Jaensson, Esq.

(57) ABSTRACT

A common connection apparatus for coupling a power tool to an extensible arm and a power supply, the apparatus including a tool support base designed to support a tool, and a power supply support base designed to be affixed to the end of the extensible arm. The tool support base and the power supply support base each include a plurality of power connectors, positioned for engagement when the bases are aligned. The tool support base also has an alignment stab, which is received within a channel of the power supply support base. A plurality of pins are further positioned on the tool support base, to be received in apertures of the power supply support base. By this configuration, the bases may be aligned and engaged, facilitating the transmission of power from the machinery to which the arm is affixed, to the tool.

18 Claims, 22 Drawing Sheets

(51) Int. Cl.
    *E02F 3/36*         (2006.01)
    *B66C 13/14*      (2006.01)
    *B66F 9/20*        (2006.01)
    *E02F 3/30*        (2006.01)

(56) References Cited

U.S. PATENT DOCUMENTS

| | | |
|---|---|---|
| 3,527,480 A | 9/1970 | Larson |
| 3,744,636 A | 7/1973 | Commarmot |
| 3,760,883 A | 9/1973 | Birk |
| 3,893,480 A | 7/1975 | Dunbar |
| 4,227,853 A | 10/1980 | Woodford et al. |
| 4,460,156 A | 7/1984 | Hazelrigg et al. |
| 4,611,831 A | 9/1986 | Truchet |
| 4,664,588 A | 5/1987 | Newell et al. |
| 4,674,945 A | 6/1987 | Hulden |
| 4,682,913 A | 7/1987 | Shatto et al. |
| 4,738,463 A | 4/1988 | Poore et al. |
| 4,784,421 A * | 11/1988 | Alvite' .............. B25J 15/04 294/119.1 |
| 4,830,569 A | 5/1989 | Jannborg |
| 4,897,014 A | 1/1990 | Tietze |
| 5,074,373 A | 12/1991 | Schmidt |
| 5,242,258 A | 9/1993 | Weyer |
| 5,267,824 A | 12/1993 | Kishi |
| 5,332,353 A | 7/1994 | Arnold |
| 5,465,513 A | 11/1995 | Sonerud |
| 5,486,084 A | 1/1996 | Pitman et al. |
| 5,802,753 A | 9/1998 | Raunisto |
| 5,829,337 A | 11/1998 | Barden |
| 5,890,871 A | 4/1999 | Woerman |
| 6,017,065 A | 1/2000 | Hellesoee |
| 6,499,934 B1 | 12/2002 | Kaczmarski et al. |
| 6,530,742 B2 | 3/2003 | Trinler et al. |
| 6,595,552 B1 | 7/2003 | Mortari |
| 6,776,571 B2 | 8/2004 | Riffle |
| 6,813,851 B2 | 11/2004 | Mieger et al. |
| 6,866,467 B2 | 3/2005 | Dvorak et al. |
| 7,021,668 B2 | 4/2006 | Langenfeld et al. |
| 7,290,977 B2 | 11/2007 | Albright et al. |
| 7,331,489 B2 | 2/2008 | Glynn et al. |
| 7,464,967 B2 | 12/2008 | Mieger et al. |
| 7,493,712 B2 | 2/2009 | McCormick et al. |
| 7,814,689 B2 | 10/2010 | Vering et al. |
| 7,963,054 B2 | 6/2011 | Wimmer et al. |
| 7,984,575 B2 | 7/2011 | Robl et al. |
| 8,020,623 B2 | 9/2011 | Parks et al. |
| 8,281,506 B2 | 10/2012 | Stefek et al. |
| 8,336,922 B2 | 12/2012 | Tiberghien et al. |
| 8,544,562 B2 | 10/2013 | Weyer |
| 2003/0233773 A1 | 12/2003 | Mieger et al. |
| 2004/0151567 A1 | 8/2004 | Magni |
| 2009/0051163 A1 | 2/2009 | Frey et al. |
| 2009/0158625 A1 | 6/2009 | Pope et al. |
| 2010/0034580 A1 | 2/2010 | Bernhard |
| 2010/0146721 A1 | 6/2010 | Villanueva Sautu |
| 2010/0229956 A1 | 9/2010 | Luyendijk |
| 2011/0002765 A1 | 1/2011 | Asam et al. |
| 2011/0150617 A1 | 6/2011 | Hrter et al. |
| 2011/0211903 A1 | 9/2011 | Ramun et al. |
| 2012/0000192 A1 | 1/2012 | Ramun |
| 2012/0205907 A1 | 8/2012 | Westendorf et al. |
| 2013/0056588 A1 | 3/2013 | Harr et al. |
| 2014/0178166 A1 | 6/2014 | Andruch, III et al. |
| 2017/0300040 A1 | 10/2017 | Butler |

\* cited by examiner

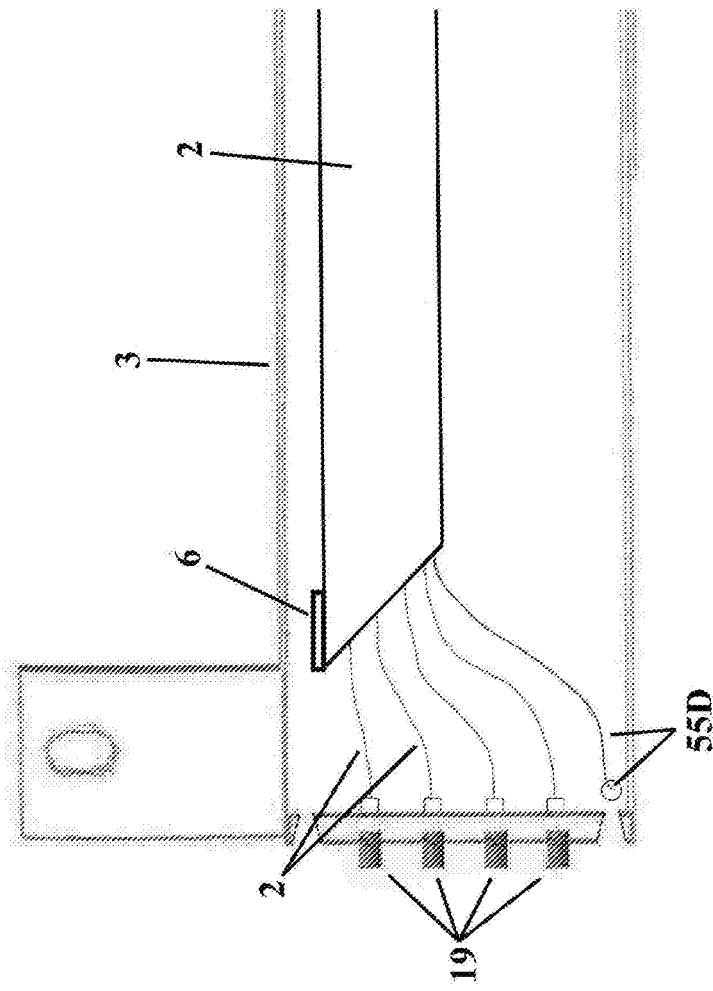
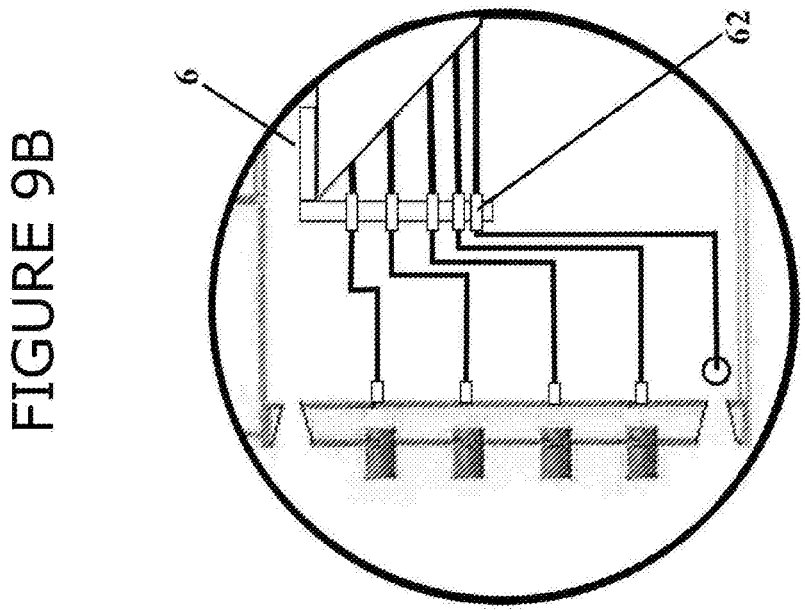
FIGURE 9A
FIGURE 9B

PLUG AND PLAY TOOL CONNECTION

BACKGROUND OF THE DISCLOSED TECHNOLOGY

The disclosed technology relates to a method of connecting a variety of tools by means of a common connection design, useful with a telescopic type support base (e.g. mobile, articulated, knuckle-boom) or other articulated support base, with the capability of supplying hydraulic, pneumatic, electric, fiber optic and/or wireless power to the tool, as well as facilitate communication between the tool and a remote computer or server. The connection method is comprised of increasingly precise alignment steps, with the last step completing the power source connection to a selected tool. The connection method of the disclosed technology avails tools primarily reserved for the jib or stick boom cranes to telescopic boom cranes (e.g., mobile, articulated knuckle-booms) and other articulated support bases.

Present technology provides one alignment step to make the connection and affixation of a tool to an arm, thereby requiring significant time and manual engagement. By means of the disclosed technology, providing multiple alignment steps, a means to affix a tool to the end of an extensible arm is provided.

GENERAL DESCRIPTION OF THE DISCLOSED TECHNOLOGY

The disclosed technology is, generally, a common connection apparatus for coupling a power tool to an extensible, articulable or rotatable arm and a power supply. The common connection apparatus includes a tool support base and a power supply support base. The tool support base has a power receive connection plate supporting an alignment stab, two or more alignment pins and a plurality of power connectors (e.g., power receptacles), designed and configured to be affixed to a tool. By this design and configuration, many types of tools may share the same connection method of the disclosed technology. As some tools will require more power connections from the tool support base than others, and the type of power required may vary, the support base may be equipped with a sufficient number of the same or different types of power receptacles to accommodate the power requirements of the intended tools. In an exemplary embodiment, a spot drill may be articulated into a number of positions by means of hydraulic motors, each motor receiving power through a power receptacle of the tool support base; alternatively, a bucket may be manipulable by means of double acting cylinders, each cylinder likewise receiving power through a power receptacle.

The power supply support base of the common connection apparatus is designed and configured to be affixed to a distal end of an extensible, articulable or rotatable arm, having a stab receiver with a channel defined by channel walls, and a power supply connection plate supporting a plurality of power connectors (e.g., power plugs) and having a plurality of apertures. The power supply connection plate is positioned lateral to the stab receiver, and the plurality of power plugs are positioned to align and engage with the power receptacles of the tool support base when the alignment stab is received within the channel of the power supply support base. Similarly, the apertures are sized and positioned on the power supply connection plate to receive the alignment pins of the tool support base, when the bases are aligned.

In some embodiments, the tool is or includes a camera, a sensor or one or more similar devices, capable of gathering or receiving data or images. In these embodiments, in addition to power plugs and receptacles, coaxial, Ethernet or similar connectors (with, for example, pin and socket contacts, respectively) may be positioned with the power plugs and receptacles on the bases, to facilitate data and image collection and communication. Further, in the event that some or all of the power plugs, power receptacles and other data connectors are not used for a particular tool, protective covers may be placed over the connector component to protect the plugs, receptacles and connector components from exposure or other damage.

When the tool support base is affixed to the tool and the power supply support base is affixed to the arm, the disclosed technology causes the alignment of the tool with the arm, and in such alignment and when the tool support base is fully engaged with the power supply support base, facilitates the coupling of the connectors.

In embodiments of the disclosed technology, the alignment stab is positioned on and extends from a lateral portion of a face of the power receive connection plate, and the power receptacles and the alignment pins are positioned on and extend from an opposing lateral portion of the face of the power receive connection plate. In some embodiments, the alignment stab includes an elongated element having a circular or rectangular cross-section (or other elongated shape), defined by a body having a shoulder near a distal end of the body, and terminating in a head, the head having a smaller cross-sectional area than the cross-sectional area of the body. One or more lock grooves may be positioned about alignment stab, such as about the circumference of the head.

The stab receiver may include one or more locking fingers, supported within its channel, for engagement with the lock grooves of the alignment stab. These locking fingers may include a bar with a tab at a distal end, and may be positioned within the channel so that the tabs thereof may be received and secured in the lock groove(s) of the alignment stab. To maintain this position, and facilitate movement of the locking fingers into (and out of) the lock grooves, the bars of the locking fingers may be pivotally secured to a support ring affixed or removably supported within the stab receiver. For example, the locking fingers may be positioned equidistant about an axial center of the support ring, the bars extending from the support ring into the channel of the stab receiver. In this configuration, the power supply support base may have a plurality of springs, positioned between the locking fingers and the channel walls, to encourage and removably secure each locking finger into the lock groove. The bars of the locking fingers may extend beyond a distal end of the support ring, and terminate with terminal legs. These terminal legs may be positioned at an angle from the bar, extending towards the channel walls.

To remove the locking fingers from the lock grooves, an unlock sleeve may be provided, designed and configured to move from a first position near the distal end of the support ring to a second position away from the distal end of the support ring. The unlock sleeve may move from the first position to the second position, and in such movement slide over the angled terminal legs of the locking fingers, forcing the bars of the locking fingers to pivot about the support ring with a force greater than a spring force of the springs, thereby removing the tabbed ends of the locking fingers from the lock groove(s) of the stab. This movement of the unlock sleeve between the first and second positions may be controlled by a hydraulic cylinder having a cylinder tube with a piston rod, wherein the piston rod translates along the cylinder tube, and wherein the unlock sleeve is affixed to an end of the piston rod, thereby causing the unlock sleeve to move with the translation of the piston rod.

In some configurations of the disclosed technology, one or more support members may be affixed to the power receive connection plate to support the tool relative to the plate. In other configurations, the tool support base may have two support members, hingedly affixed together, with one support member affixed to the power receive connection plate. In this and other configurations, a cylinder actuator may be engaged with a support member to control rotational movement of one member relative to the other.

In some embodiments, the tool support base may include one or more rotary actuators affixed to at least one of the support members, the rotary actuator controlling yaw movement of the tool relative to the base. In these or other embodiments the tool support base may also include one or more slew drives positioned between one of the members and the tool, the slew drive controlling roll direction of the tool. Rotary actuators and slew drives are typically referred to as motors requiring a hydraulic supply and a hydraulic return (provided by the common connection apparatus of the disclosed technology). Similarly, one or more linear or cylinder actuators may be affixed to the tool, and capable of securing the position of the tool relative to the tool support base. Linear (cylinder) actuators are typically referred to as cylinders but do not necessarily require a supply and return, as some cylinders will have an internal spring that allows the hydraulic supply to return to its source using the same conduit (tube or hose).

To facilitate the positioning of the alignment stab within the channel, one or more shoulder shock absorbers may be provided, the shoulder shock absorbers including a spring and a tapered guide, wherein the spring may be supported within the channel of the stab receiver by affixation at a distal end to a collar, the collar being affixed or removably supported within the channel of the stab receiver. By this configuration and their position within the channel of the stab receiver, the shoulder shock absorbers guide and secure the body of the alignment stab within the channel, and by the spring force of the spring, encourage removal of the alignment stab from the channel. Specifically, the shock absorber spring tension offers rigid stability of the alignment stab within the stab receiver, thereby keeping the tool affixed to the tool support base firmly seated at the end of the extensible, articulable or rotatable arm, reducing vibration during use.

The disclosed technology also includes a method of coupling a tool to an extensible, articulable or rotatable arm, and providing power to the tool, through a common connection apparatus. The method includes providing an extensible, articulable or rotatable arm engaged with a power supply, a tool, and a common connection apparatus to removably couple the tool to the arm. The common connection apparatus includes a tool support base affixed to the tool, and a power supply support base affixed to a distal end of the arm and engaged with the power supply. The tool support base has a power receive connection plate supporting an alignment stab, a plurality of alignment pins and a plurality of power connectors. The tool is engaged with the power connectors (by conduits) so that power may flow to the tool.

As herein described, the power supply support base includes a stab receiver defined by a channel, and a power supply connection plate supporting a plurality of power connectors, and having a plurality of apertures aligned to receive the pins of the power receive connection plate. This channel of the stab receiver may be aligned with an interior channel of the distal end of the arm, and the power connectors are engaged with the power supply so that power may flow from the power supply (typically but not necessarily provided on the equipment supporting the arm) through the power connectors.

The power supply connection plate of the power supply support base is positioned lateral to the stab receiver, supporting the plurality of power connectors and apertures to align with the power connectors and pins of the tool support base, when the plates are aligned (with the alignment stab received within the stab receiver).

By this configuration, two alignment steps provide for the alignment of the tool support base and the power supply support base. The first alignment step includes moving the arm of the telescopic type (or articulated) support base with the affixed power supply support base to the tool support base having a tool affixed thereto, and positioning the channel of the stab receiver of the power supply support base to receive the alignment stab of the tool support base. Continuing movement of the arm allows the alignment stab to be received in the channel, which by its funnel configuration captures and further aligns the alignment stab within the channel, and further aligns the tool support base with the power supply support base.

As the arm extends, the alignment stab moves further into the channel, and the second alignment step commences, wherein the alignment pins are partially received in the corresponding apertures of the power supply support base. The apertures may be offset or have differing lengths, facilitating the graduated alignment of the tool to the support base. As the arm continues to move, the alignment stab moves further into the channel, forcing the shoulder shock absorbers to compress, and the tabs of the locking fingers make contact with the head of the alignment stab. Simultaneously, the alignment pins are further received in the apertures of the power supply support base, and the power receptacles and power plugs are aligned. With the final extension of the arm, the head of the alignment stab spreads the locking fingers apart as the lock finger tabs follow the contour of the rounded head, until the tabs reach the lock groove, at which position the shoulder of the alignment stab compresses the shock absorber springs, the pins are fully received within the apertures, and the power plugs are fully received within the power receptacles. With the power supply plugs firmly seated within the power receptacles and the stab secured within the channel, the tool is supported by the arm by means of the common connection apparatus of the disclosed technology, and power is supplied to the tool. The shock absorber spring tension offers ridged stability, keeping the tool firmly seated, reducing vibration of the tool in use.

The method may also include a method for decoupling a tool engaged with an extensible, articulable or rotatable arm by means of a common connection apparatus, allowing coupling of a second tool to the arm. In decoupling the tool, an unlock sleeve encircling the locking fingers is actuated to move along the distal end of the locking fingers, away from the support ring, passing over the angled portion of the locking fingers to overcome the spring tension of the spring at the proximal end of each locking finger, thereby causing the tabs of the fingers to be removed from the lock groove of the alignment stab of the common connection apparatus, and releasing the tool support base from secured engagement with the power supply support base. Then, by movement of the arm, the tool support base may be retracted, causing disengagement of the tool support base from the power supply support base. When the alignment stab of the tool support base is fully removed from the stab receiver of the power supply support base, the power supply support base may be aligned with a second tool affixed to a second tool support base, and engage the second tool support base with the power supply support base, by movement of the arm as hereinabove described.

While an endless number of tools may be useful in the foregoing method, and with the common connection apparatus of the disclosed technology, an exemplary list of tools includes augers, barrel grabbers, brush hogs, buckets, cameras, cleaners, crushers, drills, forks, grinders, hammers, high torque wrenches, jack hammers, lane barriers, lights, magnets, mine arches, pipe grabbers, rail road rail grabbers, rail road tie grabbers, saws, shears, spooler, spot drills, spreaders (jaws of life), tire handlers, tree shears, trenchers and various sensors.

DESCRIPTION OF THE FIGURES

The disclosed technology may be best understood with reference to the accompanying figures, wherein:

FIG. 9A is a side view of an embodiment of the power supply to the power supply support base of the common connection apparatus of the disclosed technology;

FIG. 9B is an exploded view of an embodiment of the power supply conduits to the power supply support base of the disclosed technology, with a penetrator plate anchored to the arm;

DETAILED DESCRIPTION OF THE DISCLOSED TECHNOLOGY

Figure 1:
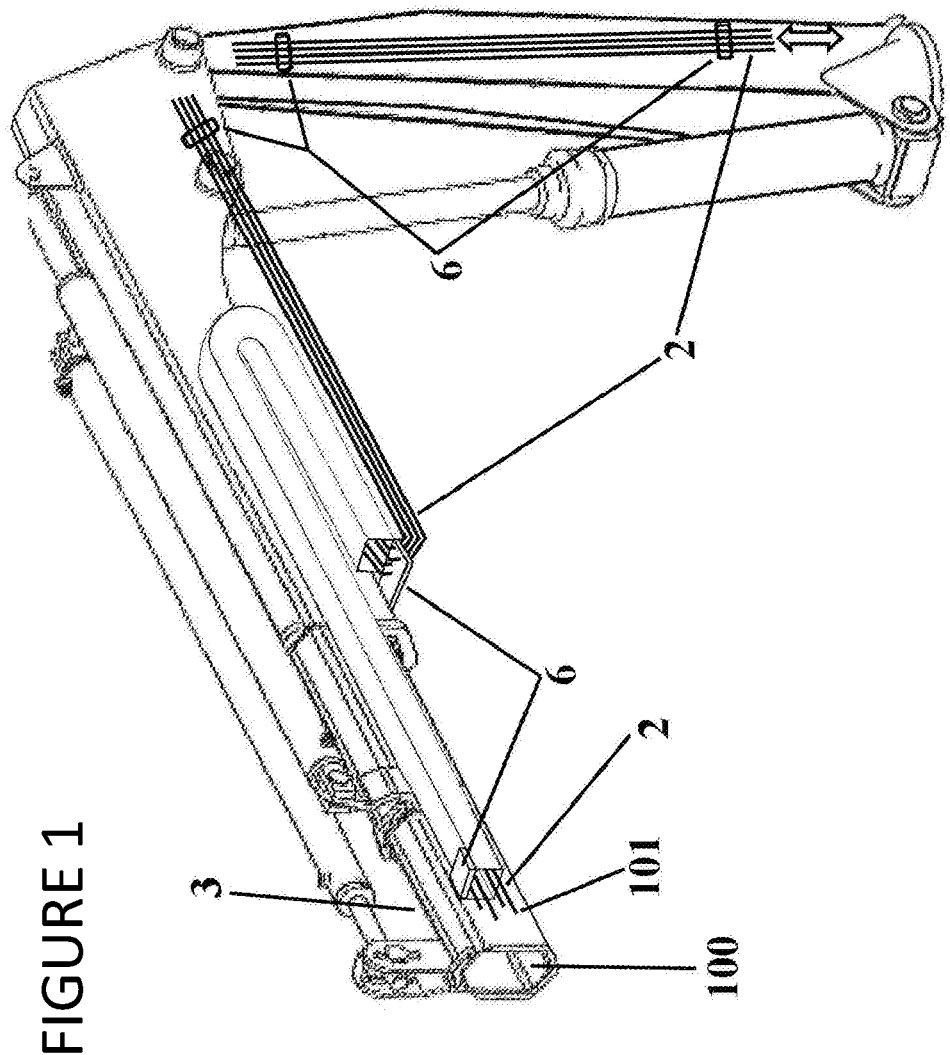
FIG. 1 is a peripheral view of an extensible arm including power wiring in accordance with the disclosed technology.
Figure 2:
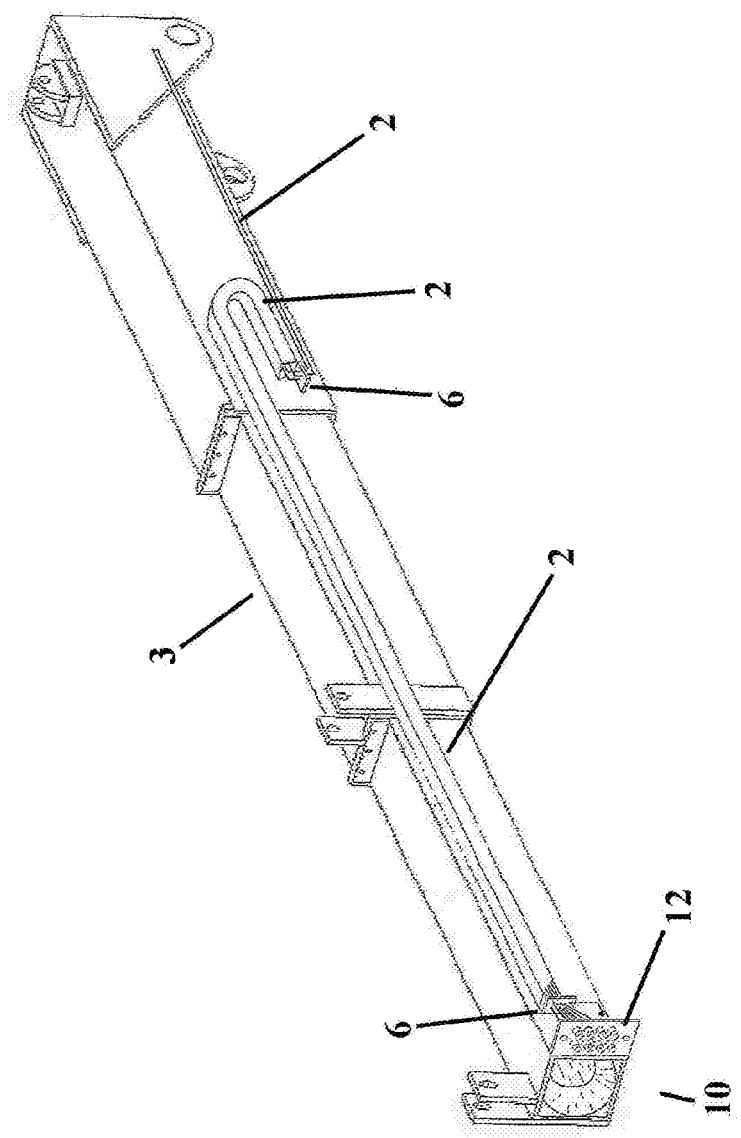
FIG. 2 is a peripheral view of an extensible arm including an embodiment of the power supply support base of the disclosed technology.
Figure 3:
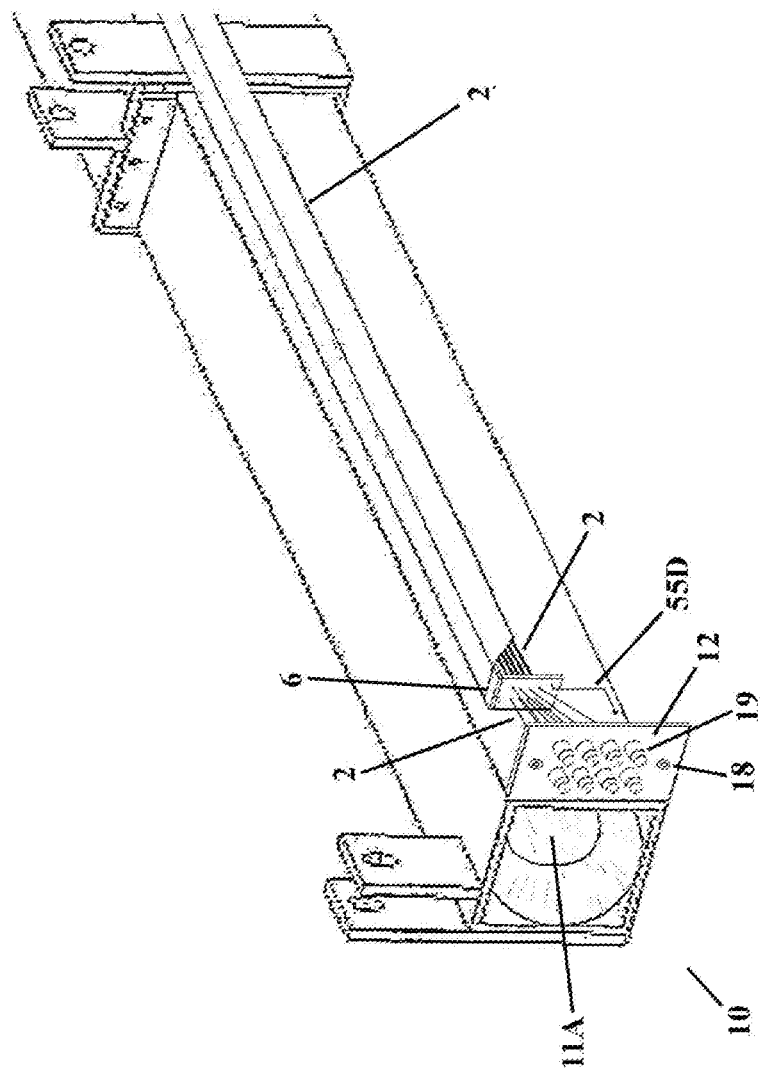
FIG. 3 is a partial view of the extensible arm of FIG. 2, showing with greater detail the embodiment of the power supply support base of the disclosed technology.
Figure 4:
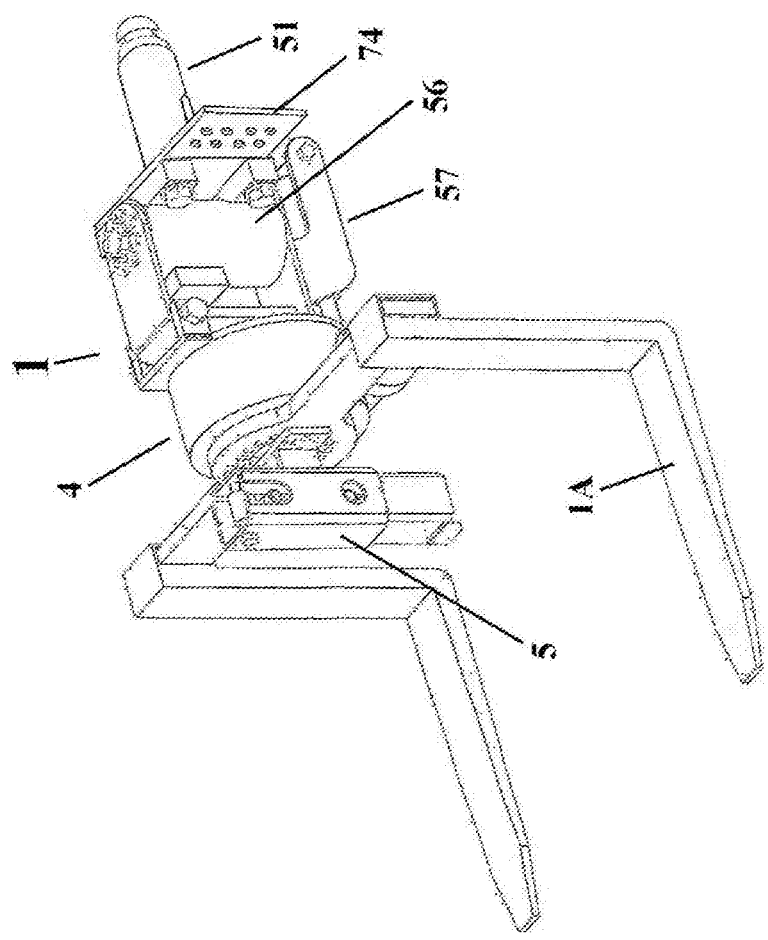
FIG. 4 is a perspective view of a tool affixed to an embodiment of a tool support base of the disclosed technology.

Shown in FIG. 1 is a connection method for power tools to a boom or other structure, wherein a tool cavity/receiver 100 is provided to support a portion of a fork or other tool, welded or bolted outside the end of the boom. In the prior art, the cavity/receiver typically supports the tool by means of an affixed support structure, or for general lifting using wire ropes and hooks, receiving power from a plurality of power plugs 101, which are manually positioned within and received by a corresponding power receptacle of the tool.

The disclosed technology, embodiments of which are shown in the Figures, provides a common connection design for coupling an assortment of power tools 1 to an arm 3 and a power supply 2, wherein the arm is, for example, a telescopic, articulated and/or rotatably hinged structure, such as a knuckle boom, or other structures or equipment capable of kinematic coupling. As shown in FIGS. 5, 6A-6E and 13, the common connection apparatus of the disclosed technology includes a tool support base 50 and a power supply support base 10, which when affixed to the tool and the arm, respectively, cause the alignment of the tool (by means of a tool support base) with the power supply support base affixed at the end of the arm, and in such alignment facilitate the coupling of a plurality of power connectors (e.g., power plugs) 19 of the power supply support base with corresponding power connectors (e.g., power receptacles) 59 of the tool support base. In this configuration, the power receptacles are connected to elements of the tool requiring power, and the power plugs are connected to the power supply (see FIGS. 1-3, 9A-9B and 12A-12B). Various types of power may be used to power the tool with the disclosed technology, including without limitation hydraulic, pneumatic, electric, fiber optic and wireless power. By its configuration, the common connection design of the disclosed technology supports the tool at the distal end of the extensible arm, and facilitates the transmission of power from the power supply to the tool, based on the requirements of the tool.

The common connection apparatus of the disclosed technology, by the novel design and configuration of the bases 10, 50, provides increasingly precise (graduated) alignment configurations to removably support and secure the bases one-to-another, thereby securing the tool to the arm and completing the power source connection between the power supply and the tool, as described herein and in the Figures.

In an embodiment, as shown in FIGS. 4, 5, 6A-E, 11 and 12A-12B, the tool support base 50 includes a power receive connection plate 74 having an exposed face to abut against the exterior surface of the power supply support base. The power receive connection plate supports on its exterior face (or through apertures in the plate) an alignment stab 51, a plurality of power connectors (e.g., power receptacles) 59, and two or more alignment pins 58. The alignment stab may be positioned on and extend from one lateral portion of the exposed face of the power receive connection plate, and the power receptacles and the alignment pins may be positioned on and extend from an opposing lateral portion of the exposed face of the power receive connection plate. Other configurations with similar alignment and power transfer purposes may be suitable.

The alignment stab 51 of the tool support base is an elongated element that may, but does not necessarily, have a circular or rectangular cross-section. The alignment stab may be solid stainless steel, although the stab may be made from other materials, and/or have a hollow configuration. The non-magnetic and non-corrosive qualities of stainless steel is particularly useful in the disclosed technology. The alignment stab may comprise an Acme thread at the proximal end, wherein the power receive connection plate has a corresponding threaded aperture to receive the proximal end of the alignment stab; in this configuration, the alignment stab (once threaded into the aperture of the plate) may be further affixed to the power receive connection plate by tack welding techniques and/or set screws.

In some embodiments as shown in FIGS. 6A-6E and 11 and other figures, the alignment stab 51 is defined by a body 51D having a shoulder or recessed area 51A near the distal end of its body, terminating in a head 51B, the head having a smaller cross-sectional area than the cross-sectional area of the body. The head may comprise a bulb or other rounded or tapered surface. A lock groove 51C may be positioned entirely about the circumference of the head, or in another embodiment a plurality of lock grooves may be aligned and positioned about the head for engagement with the locking fingers, as herein described.

As shown in FIGS. 5, 6A-6E and 11 and other figures, the power connectors (shown as receptacles) 59 of the tool support base are affixed to and through the power receive connection plate, positioned on the plate so that when the tool support base is engaged with and secured to the power supply support base (as shown, for example, in FIG. 6E), the power receptacles are aligned and engaged with the power plugs 19 of the power supply support base, so that power may flow from the power supply to the tool.

Similarly, the embodiments shown in the figures include a pair of alignment pins 58 affixed to the exposed face of the power receive connection plate, above and below the power receptacles, wherein the alignment pins are positioned on the plate so that when the tool support base is engaged with and secured to the power supply support base, the alignment pins are aligned with and received by corresponding apertures 18 of the power supply support base (see FIGS. 6A-6E); other pin configurations may also be suitable for purposes of the disclosed technology. These alignment pins may be conical, with an elongated body and a tapered leading edge. In some embodiments, the alignment pins are offset, and vary in length, to facilitate the gradual alignment of the bases.

Figure 11:
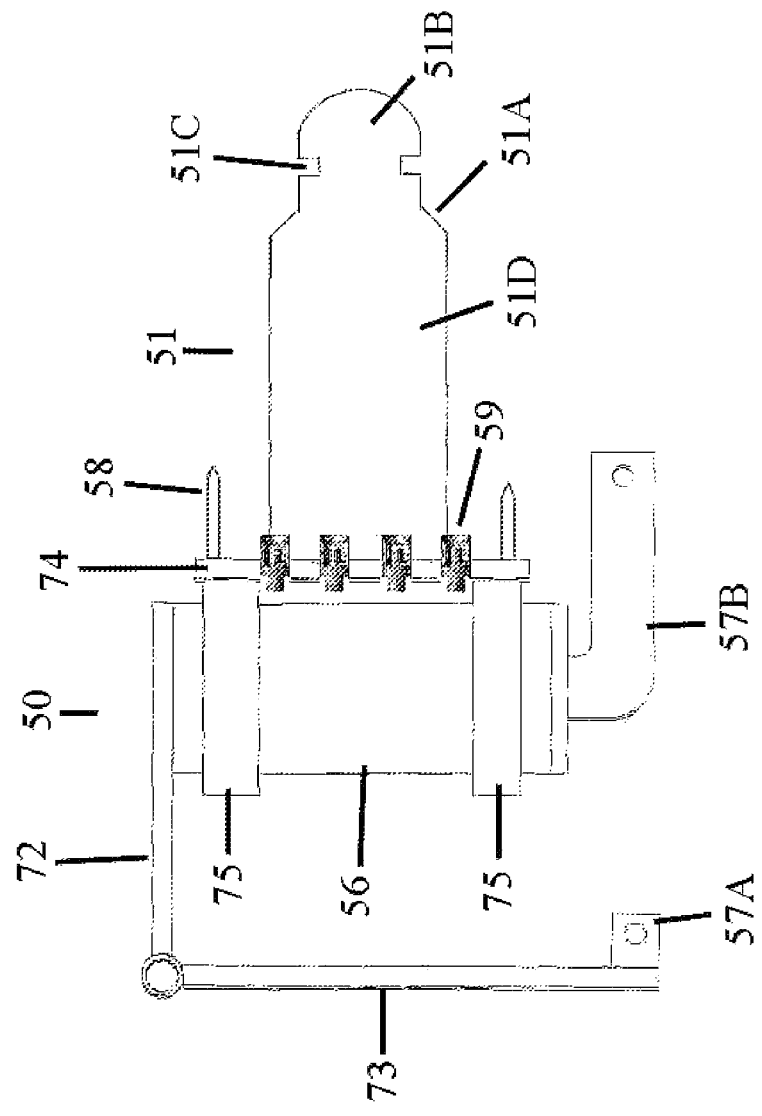
FIG. 11 is a side view of an embodiment of the tool support base of the disclosed technology.
Figure 12A:
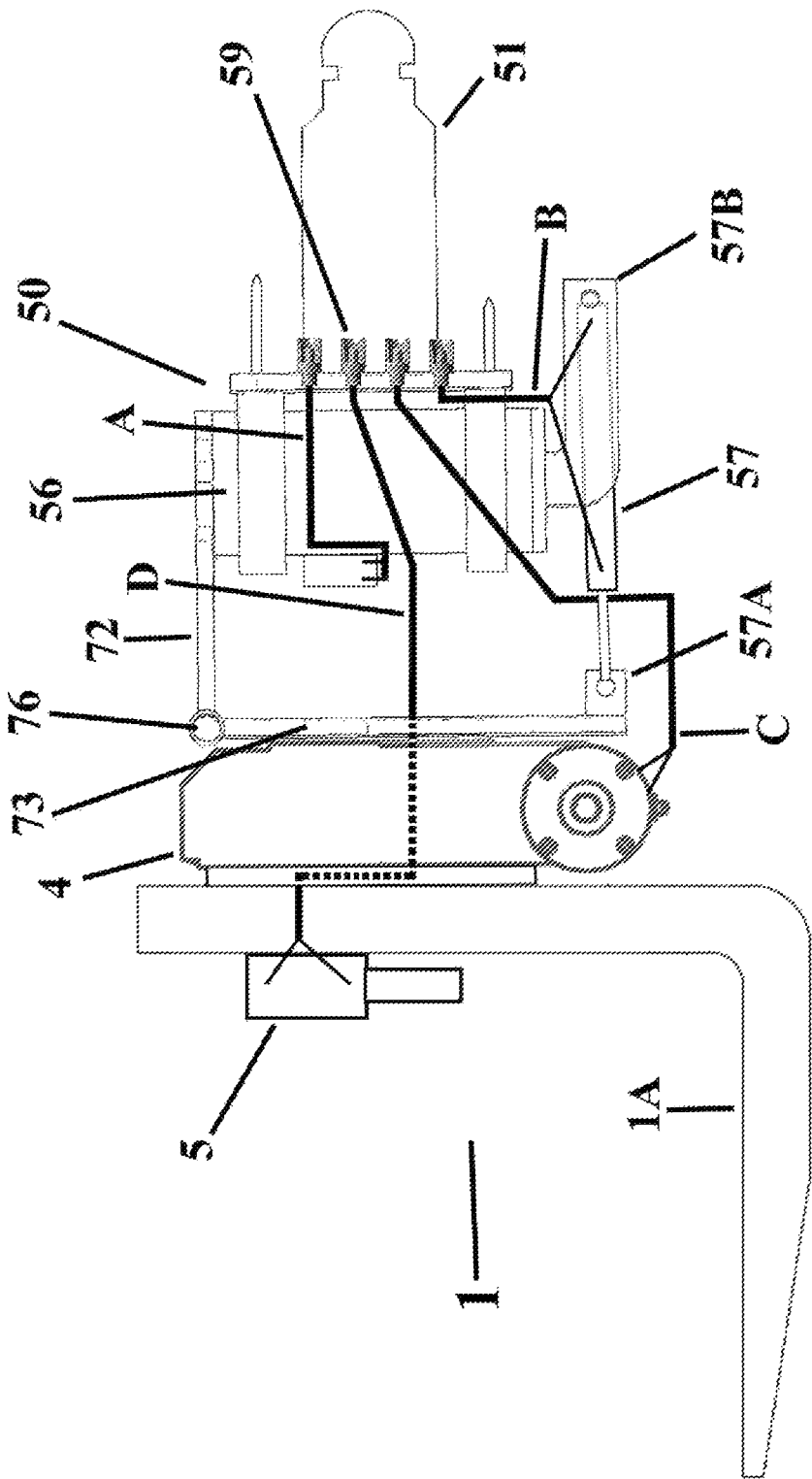
FIG. 12A is a side view of an embodiment of the tool support base of the disclosed technology, affixed to a tool.
Figure 12B:
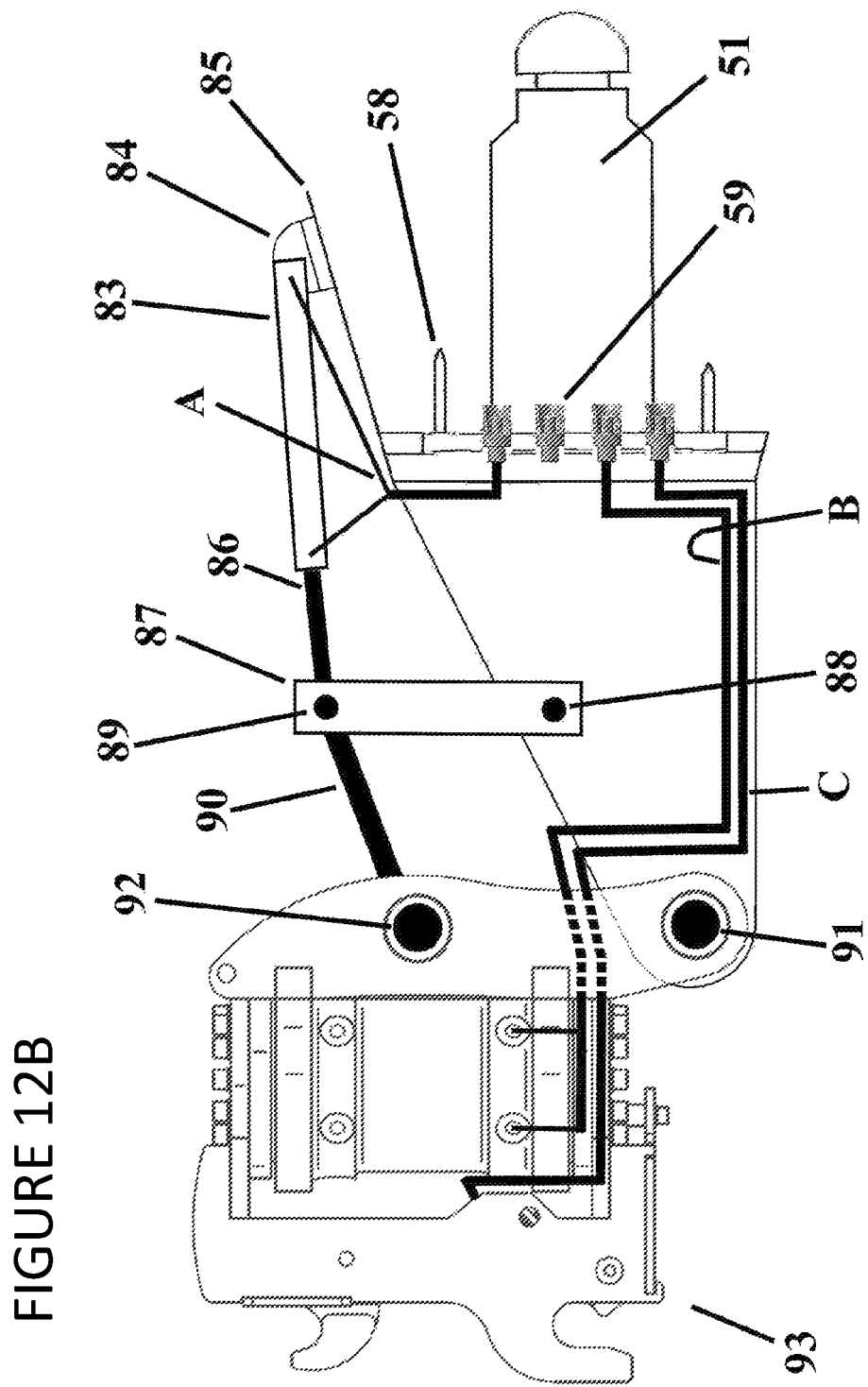
FIG. 12B is a side view of an embodiment of the tool support base of the disclosed technology, affixed to another tool.
Figure 13:
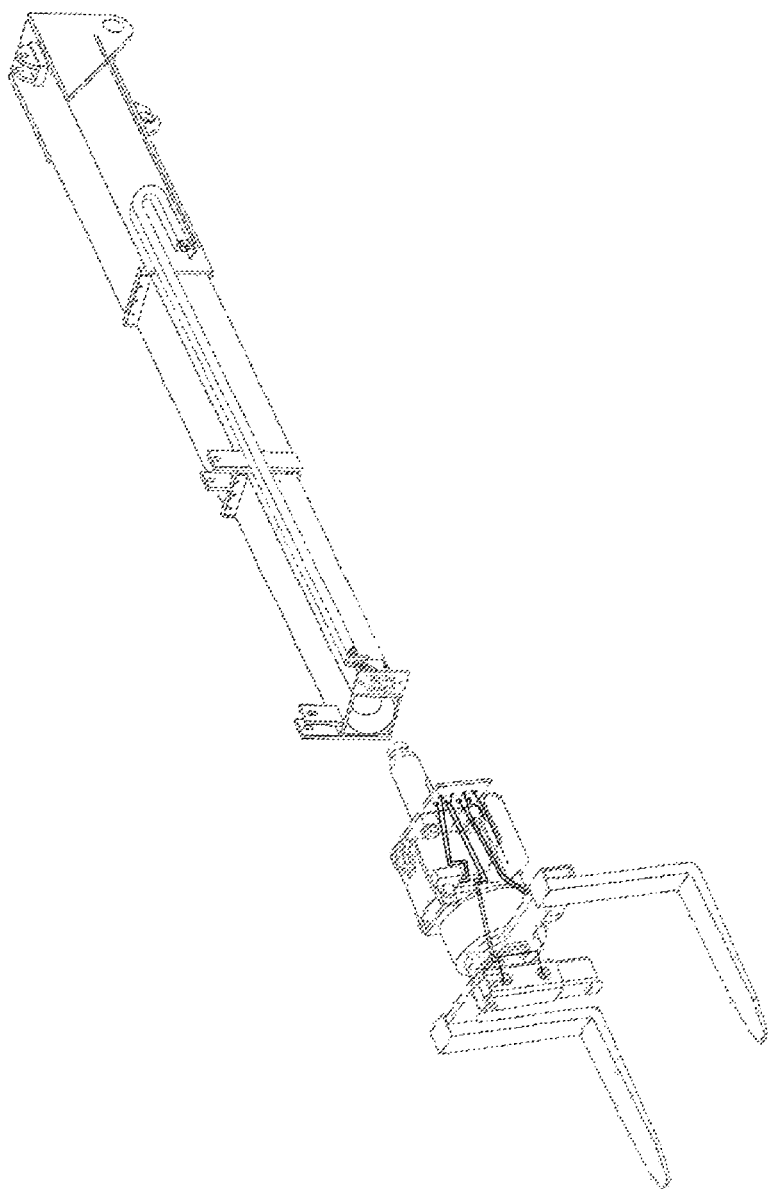
FIG. 13 is a peripheral view of the disclosed technology affixed to an extensible arm.

As shown in FIGS. 5, 6A-6E, 11 and 12A, the tool support base may further comprise two or more members 72, 73 which may be hingedly affixed (by means of pin 76, for example) together to support and facilitate the pitch/tilt movement of the tool relative to the bases of the common connection apparatus of the disclosed technology; other configurations to affix a tool to the tool support base, and manipulate its spatial position, may also be suitable for any articulated requirement. For example, as shown in FIGS. 4, 6A-6E, 11 and 12A, a rotary actuator 56 may be affixed to the power receive connection plate by means of reinforcement bands 75, and receives power through conduit A in FIG. 12A from the power receptacles; by this configuration the rotary actuator controls yaw movement of the tool relative to the arm. Parallel plate support structures 57A and 57B extending respectively from the rotary actuator 56 and the member 73, as shown in FIG. 11, may be used to support and engage a cylinder actuator 57 as shown in FIG. 12A, controlling pitch/tilt movement of member 73 relative to member 72, and powered by the power supply through conduit B, through the power receptacles and plugs of the bases of the disclosed technology. For some tools 1, such as the forks shown in FIGS. 4 and 12A, a slew drive 4 is positioned between the member 73 and the forks 1A to control roll direction of the forks, coupled with a cylinder actuator 5 used as a locking mechanism. In this embodiment, as shown in FIG. 12A, power is supplied by conduit C, D from the power receptacles to the slew drive and the locking cylinder actuator, respectively. A rotary actuator/hydraulic coupler combination 93, may be positioned at the end of the linkage components, as shown in FIG. 12B, to provide lateral movement thereby manipulating the coupler. As shown in FIG. 12B, the tool support base is shown, with hoses A (to tilt or pitch) supplying power to actuator cylinder 83 which reacts against the anchor 84 mounted on the anchor base 85. The embodiments of actuator cylinder 83, anchor 84 and anchor base 85 are comparable to the design function of the tilt movement on jib or stick booms cranes and excavators. Pivot pin 91 is essential for the tilt function. Hose B (to yaw the rotary actuator left and right) and C providing power to the coupler lock. Tilt piston rod 86 extending from tilt actuator cylinder to tilt linkage 87 is provided as a fulcrum, with a tilt link pivot pin 88 and a tilt link connect pin 89. The coupler tilt is controlled by the lever action of linkage 87 push/pull on tilt rod 90 connected to the coupler by the coupler tilt connect pin 92 and the tilt link connect pin 89.

Figure 5:
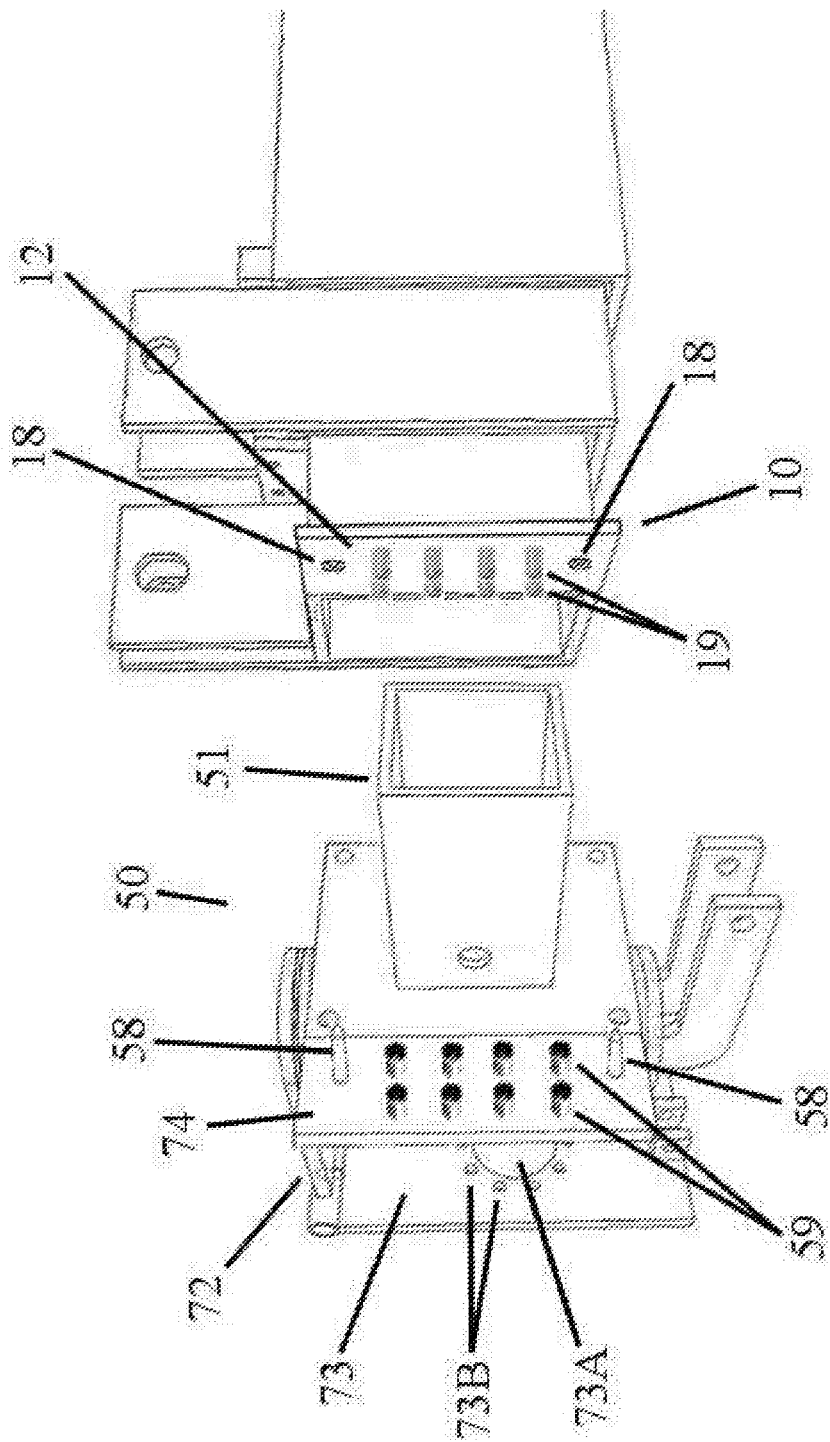
FIG. 5 is a peripheral view of an embodiment of a common connection apparatus (engaged with an extensible arm) of the disclosed technology.

As shown in FIG. 5, the vertical member 73 of the tool support base may have an aperture 73A and a plurality of orifices 73B positioned circumferentially about the aperture 73A, to facilitate tool securement to the tool support base (such as by means of screws or bolts), and further to allow a power cord of the tool to engage with the power receptacles.

Figure 6A:
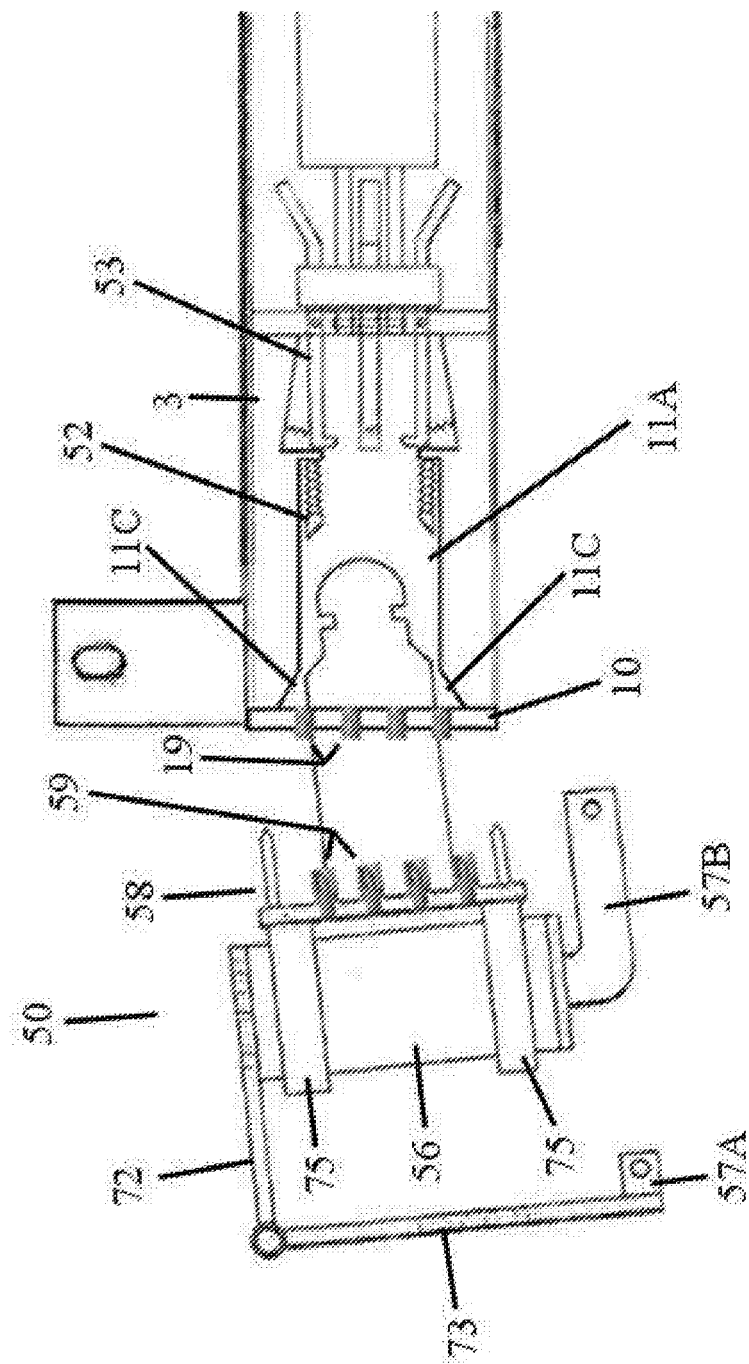
FIG. 6A is a side view of the embodiment of the common connection apparatus as shown in FIG. 5, moving into alignment with the power supply support base of the disclosed technology.
Figure 6B:
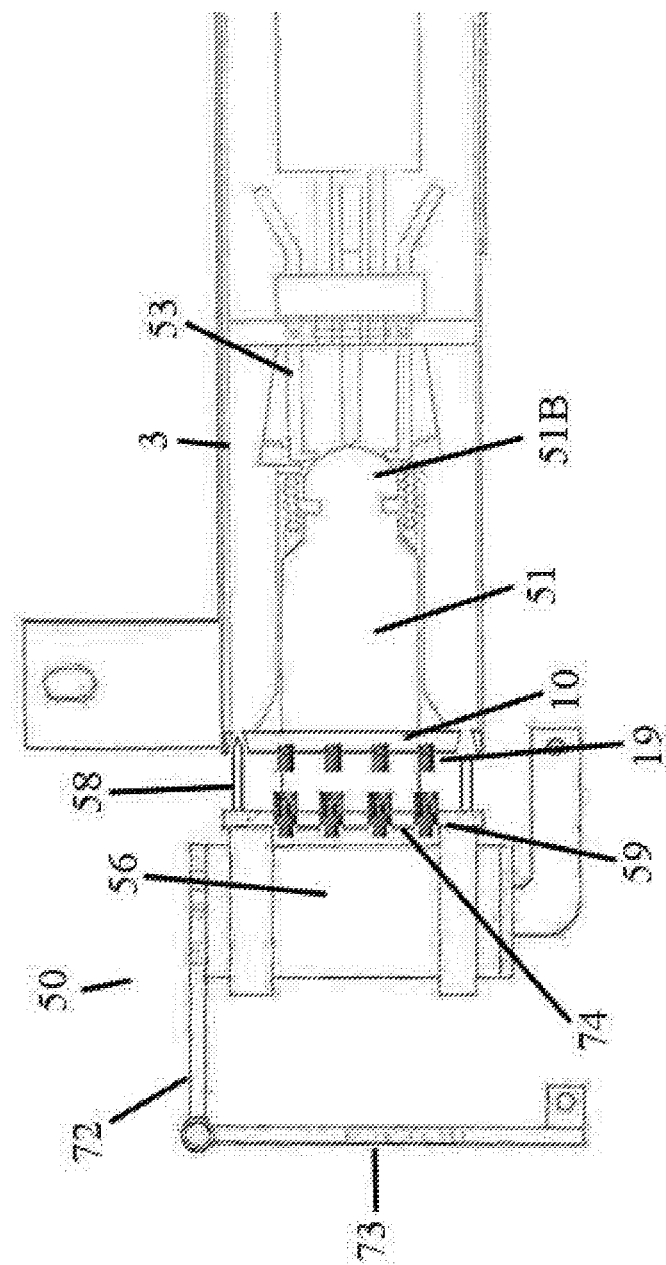
FIG. 6B is a side view of the embodiment of FIGS. 5 and 6A, as the alignment stab of the disclosed technology moves further into alignment.
Figure 6C:
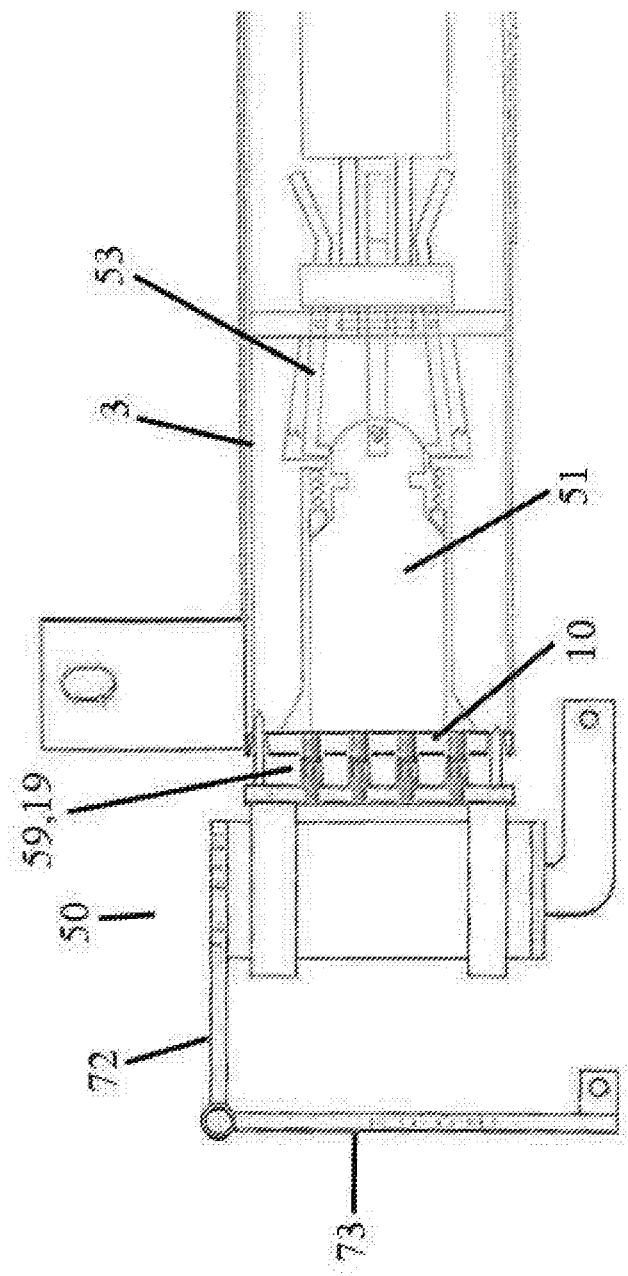
FIG. 6C is a side view of the embodiment of FIGS. 5, 6A and 6B, as the alignment stab moves even further into the channel of the stab receiver of the disclosed technology.
Figure 6D:
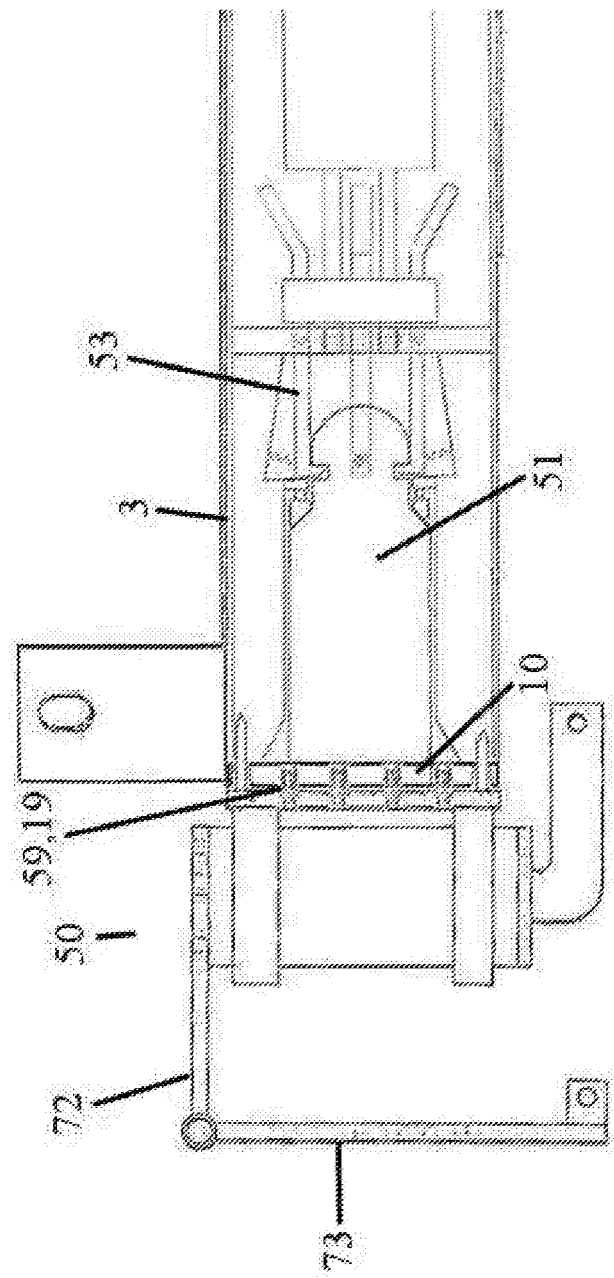
FIG. 6D is a side view of the embodiment of FIGS. 5, and 6A-6C, wherein the tool support base and the power supply support base of the common connection apparatus of the disclosed technology are connected.
Figure 6E:
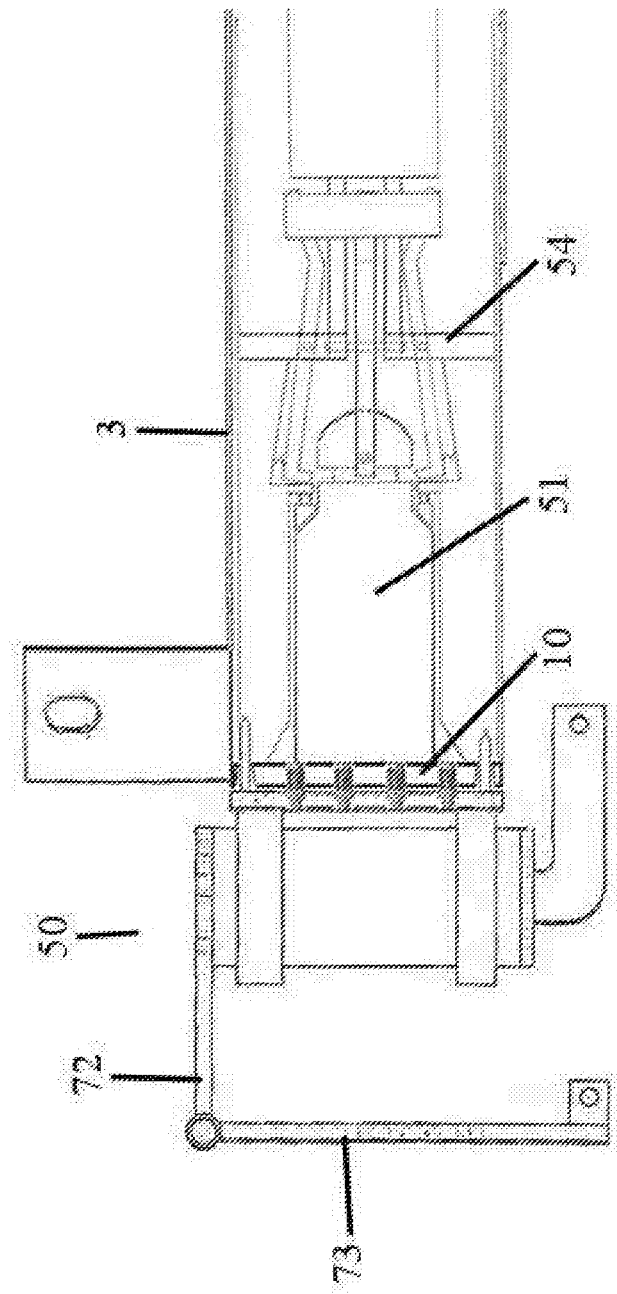
FIG. 6E is a side view of the embodiment of FIGS. 5 and 6A-6D, wherein the tool support base and the power supply support base of the common connection apparatus are being disengaged, by means of the disclosed technology.
Figure 7:
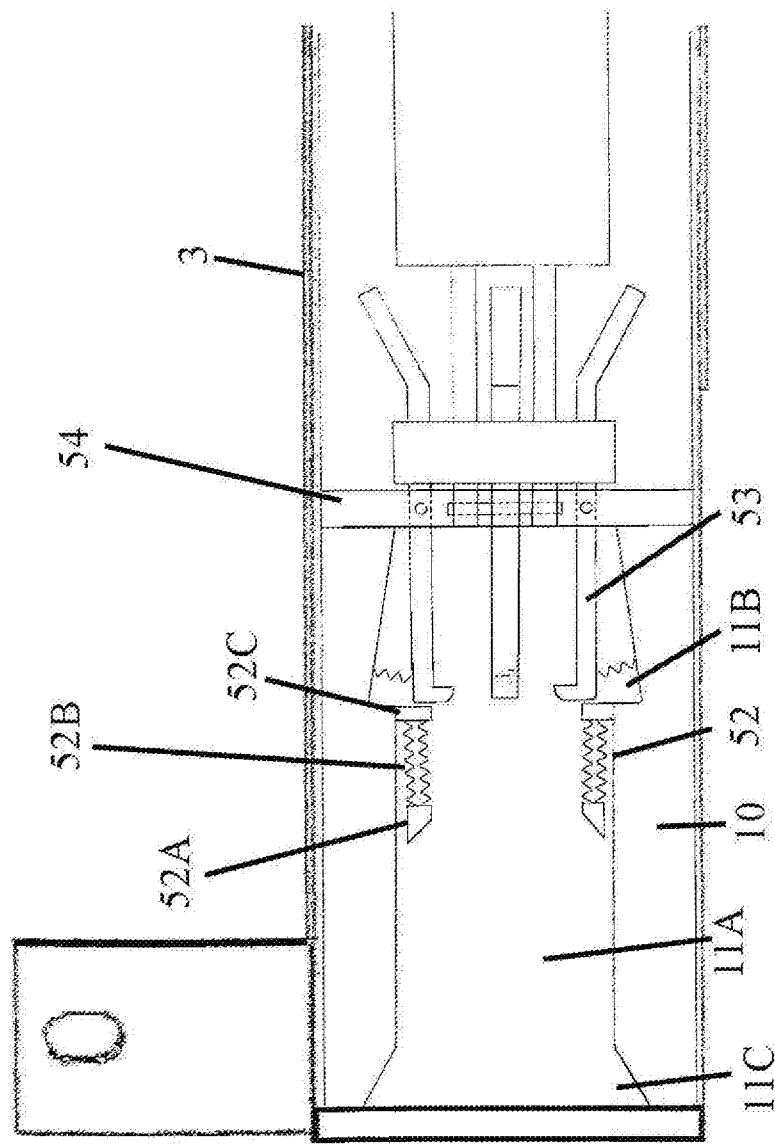
FIG. 7 is a side view of an embodiment of a stab receiver of the disclosed technology.
Figure 8A:
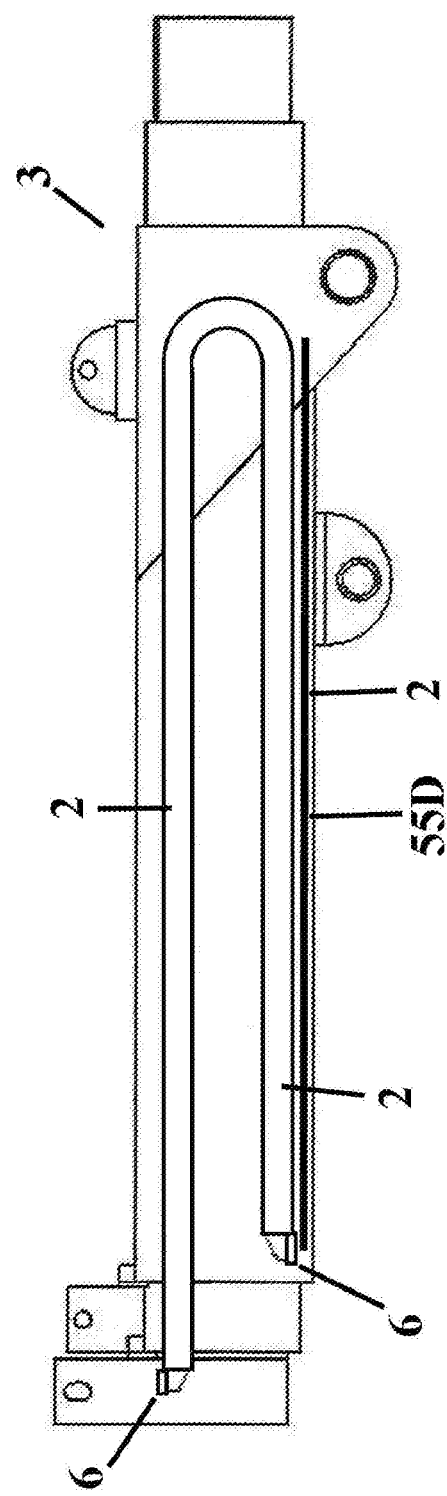
FIG. 8A is a side view of an embodiment of flexible track suitable for use with the disclosed technology, affixed to an extensible arm, with power conduits relatable to the disclosed technology, wherein the arm is in its retracted position.
Figure 8B:
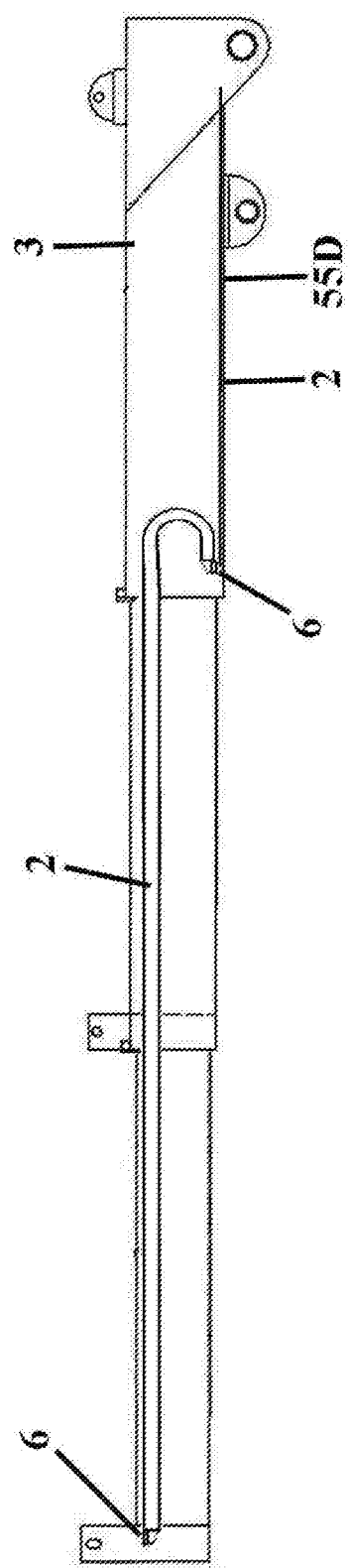
FIG. 8B is a side view of the flexible track of FIG. 8A, with the arm in its extended position.

The power supply support base 10 of the disclosed technology may be affixed to the distal end of the arm 3, and generally comprises a stab receiver defined by a channel 11A, and in some embodiments as shown in FIGS. 6A and 7, a mouth 11C. The channel 11A is positioned so that it aligns with an interior channel of the distal end of the arm (e.g., 100 shown in FIG. 1). The channel is further sized and shaped on the power supply support base to receive and support the alignment stab 51 when the tool support base 50 is positioned for securement to the support base 10, thereby aligning the tool support base with the power supply support base. As shown in FIGS. 6A-6E, in this configuration the mouth 11C has a tapered wall, defining an area of increasing cross-section from the interior of the channel 11A to the exterior of the support base 10, to allow the alignment stab to enter into the channel at an angle (by for example mechanically moving the arm 3 to the tool support base 50 to receive and support the same, or by manually positioning the tool support base in the support base 10), and with the length and cross-sectional area of the channel 11A, cause the alignment stab to align with the stab receiver. In some embodiments, the alignment stab is keyed or splined, to align the alignment stab in a corresponding keyway or groove in the channel. The leading edge of the keyway or groove may be beveled to facilitate alignment of the alignment stab relative to the stab receiver.

As shown in FIGS. 6A-6E and 7, the stab receiver of the support base 10 may further include one or more shoulder shock absorbers 52, designed and configured to receive the head 51B and position the body 51D of the alignment stab 51, wherein each shoulder shock absorber includes a spring 52B affixed at one end to a wall or collar 52C secured to or integral near the distal end of channel 11A, with a tapered guide 52A or similar structure at the other end of each spring, such that the guide tapers inwardly towards the central axis of channel 11A. The taper of the guide 52A is configured compatibly with the shape of the shoulder of the alignment stab, so that when the stab is fully inserted into the stab receiver, the springs are compressed and the tapered ends of the guides sit on the shoulder of the alignment stab. By this configuration the shoulder shock absorbers receive the head 51B of the alignment stab, and gently encourage the alignment stab into the correct position within the channel 11A, with sufficient flexibility so that none of the components are damaged during insertion of the alignment stab into the stab receiver. Further, the shoulder shock absorbers, by means of the springs, provide tension against the shoulder of the alignment stab when the stab is locked in the receiver and the tool is engaged with the common connection design of the disclosed technology and in use (being moved by means of the arm 3). The shoulder shock absorbers may also provide spring force to aid in the removal of the alignment stab from the channel.

Further, the support base 10 comprises means to engage and secure the alignment stab within the channel of the stab receiver. As shown in FIG. 7, the alignment stab may have a lock groove 51C, and as shown in FIGS. 6A-6D, 7, 10A and 10B, a plurality of locking fingers 53 may be positioned securely within the stab receiver for engagement with the lock groove. A support ring 54 within the channel of the stab receiver may pivotally support the locking fingers in the channel, so that the tabbed ends 53A thereof are received within and firmly engaged with the lock groove 51C of the stab, when the stab is fully positioned within the channel (see FIGS. 6E and 10A). In the embodiment shown, three locking fingers 53 are positioned equidistant about an axial center of the support ring 54. The locking fingers may include bars 53B, pivotally affixed to the support ring 54, with tabbed ends 53A at the end of each bar, extending inward from the bar towards the longitudinal axis of the channel 11A, and sized and configured to fit securely within the lock groove 51C of the stab. Springs 53C may be positioned between the locking fingers and the side (reaction wall) of the channel 10, to encourage and removably secure the fingers into the grooves 51C when aligned therewith, until removed as herein described. These springs may be attached to the locking fingers, to the channel wall, or both.

By this configuration, when the alignment stab 51 is inserted into the channel 11A, the head of the alignment stab traverses between the tabbed ends of the locking fingers (the locking fingers pivoting at the point of engagement with the support ring 54 to accommodate the head of the alignment stab) until the tabbed ends align and engage with the groove 51C, thereby removably securing the stab within the channel (see FIGS. 6A-6E).

As shown in FIG. 7, the channel 11A may comprise an internal collar 52C or similar support structure to secure and support an end of the shoulder shock absorber 52, without inhibiting pivotal movement of the locking fingers 53. Further, the channel 11A may have a recess 11B positioned within the channel internal to the collar, to accommodate the tabbed ends 53A of the locking fingers as they traverse the surface of the stab head during alignment, and further as they move in and out of the lock groove, as herein described.

Figure 10A:
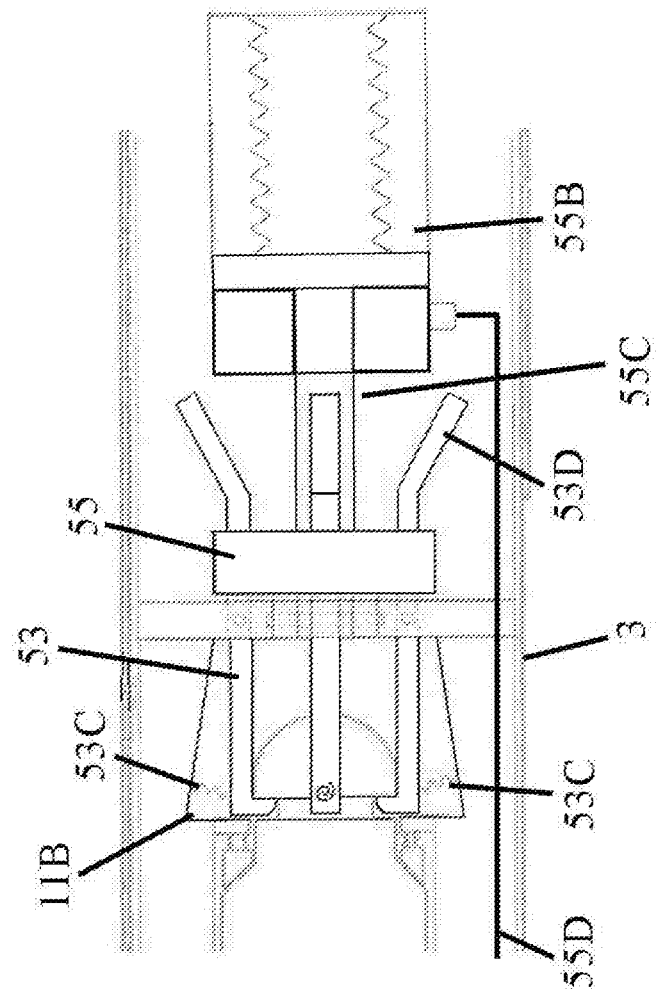
FIG. 10A is a side view of an embodiment of the channel of the power supply support base, wherein the locking fingers are engaged with the lock groove of the alignment stab head.
Figure 10B:
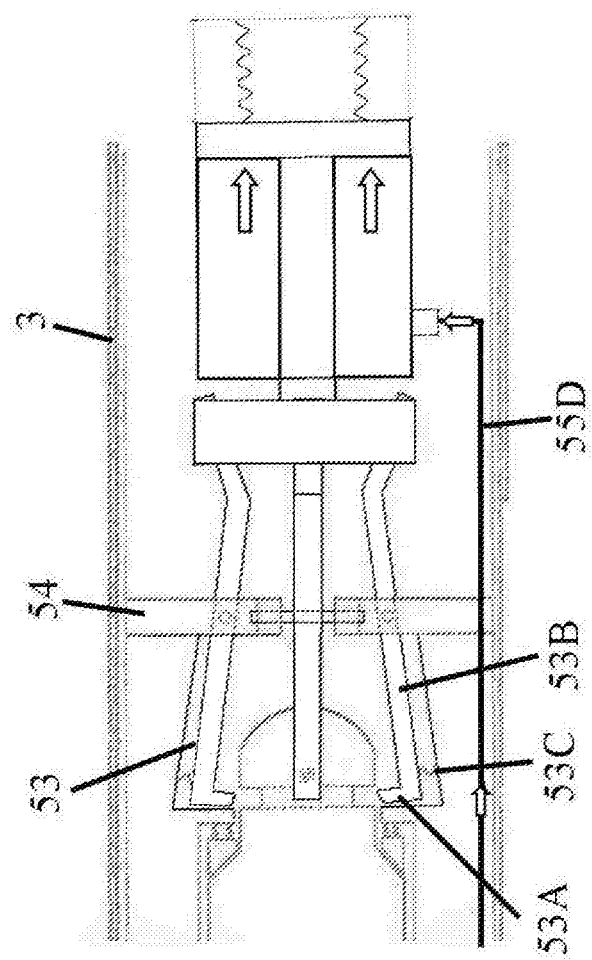
FIG. 10B is a side view of an embodiment of the channel of the power supply support base, wherein the locking fingers are released from the lock groove of the alignment stab head.

The disclosed technology further includes means to mechanically disengage the tool from the arm, by lifting the tabbed ends of the locking fingers from the groove, causing them to be repositioned outwards into the recess 11B of the channel. In the embodiment shown in FIGS. 10A-D, the locking fingers 53 terminate with legs 53D, extending from the bars at an angle towards the walls of the channel 11A. An unlock sleeve 55 is provided on the interior side of the support ring 54, designed and configured to move from a first position near the support ring 54 (as shown in FIG. 10A), to a second position distal to the support ring (as shown in FIG. 10B). As the unlock sleeve moves from the first position to the second position, it slides over the angled legs 53D of the locking fingers, forcing the lock fingers to pivot about the support ring with a force greater than the spring force of the springs 53C, thereby removing the tabbed ends of the locking fingers from the lock groove(s) 51C of the stab, and into the recess 11B. When the tabbed ends of the locking fingers are completely removed from the lock groove(s), the stab is no longer secured within the channel and may be removed.

Figure 10C:
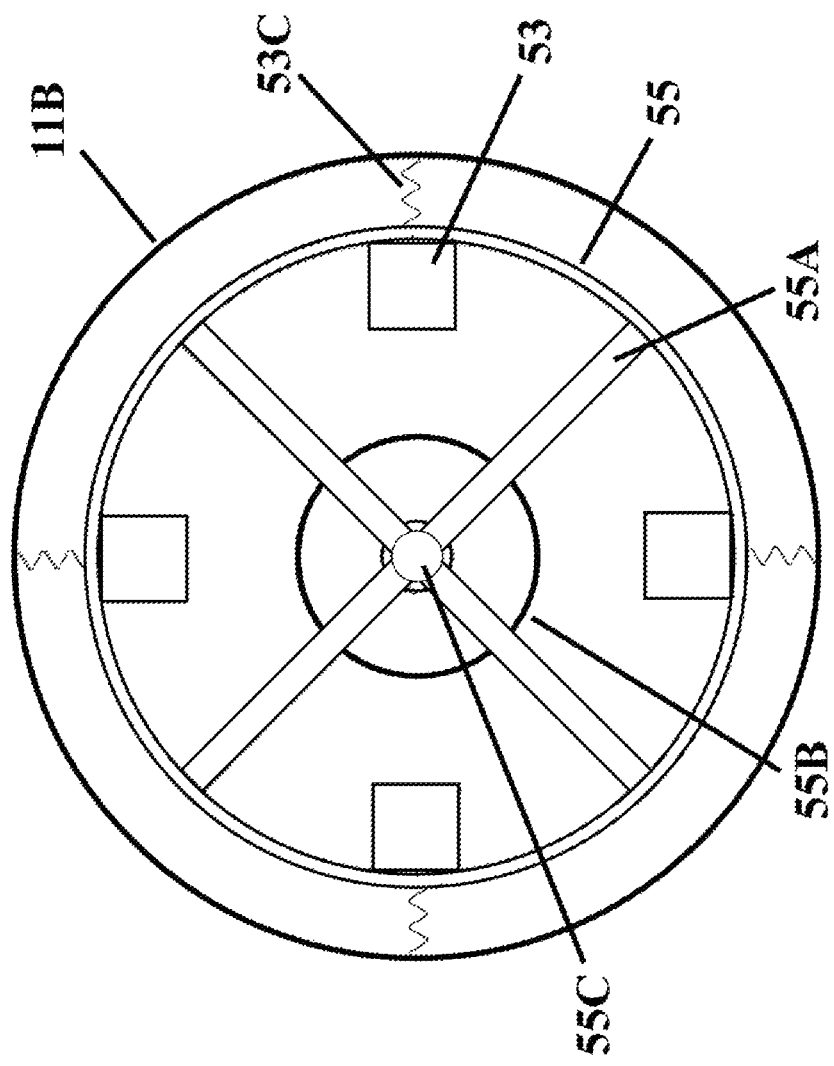
FIG. 10C is an end view of an embodiment of the unlock mechanism of the disclosed technology.
Figure 10D:
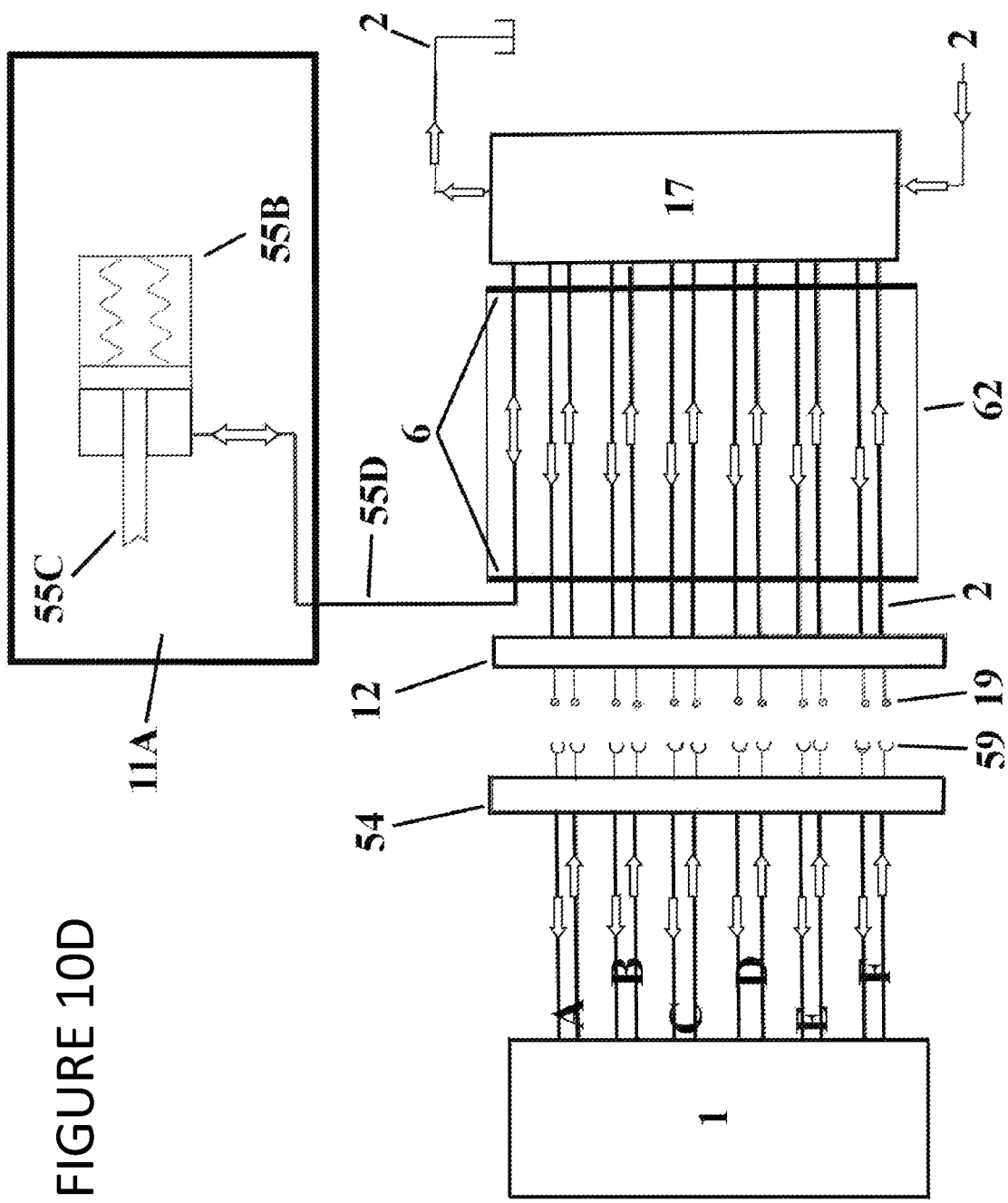
FIG. 10D is a circuit design of the power transfer suitable for use with the common connection apparatus of the disclosed technology.

As shown in FIGS. 10A-10D, movement of the unlock sleeve 55 between the first and second positions may be controlled and powered by, for example, a hydraulic cylinder having a cylinder tube 55B with a piston rod 55C. Power is supplied to this sleeve through hoses supported with the power source/hose cable track 2, as herein described. As shown in FIG. 10C, the unlock sleeve is affixed by webbing 55A to the distal end of the piston rod 55C, thereby moving with the piston rod. As shown in FIG. 10D, movement of the piston rod may be controlled by the manifold 17, maintaining the unlock sleeve in the second position while the stab 51 is being removed from the channel 11A, and otherwise securing the unlock sleeve in the first position. Hydraulic fluid is supplied to the hydraulic cylinder by tubing 55D, as shown in FIGS. 9A, 10A, 10B and 10D. In operation, tubing 55D supplies the hydraulic power when the hydraulic cylinder is activated, to unlock the locking fingers from the stab 51, and further serves as a return path for the hydraulic fluid when the hydraulic cylinder is deactivated. When this hydraulic circuit is deactivated or normally locked, the spring pressure in the hydraulic cylinder overcomes the hydraulic pressure, pushing the hydraulic oil back to the overall power distribution (reservoir), and causing the unlock sleeve back to the first position.

All or some of the components of the stab receiver may be designed and configured as a cartridge, removably secured within the stab receiver, allowing the components to be removed for maintenance and repair.

As shown in FIG. 5 and other figures, the power supply support base 10 further comprises a power supply connection plate 12, positioned lateral to the exterior surface of the mouth of the stab receiver, and supporting therethrough a plurality of power connectors (e.g., power plugs) 19, each aligned to engage with the power connectors (e.g., power receptacles) 59 of the tool support base 50. The power plugs are further engaged with the conduit 2 so that power flows from the power supply, through the power plugs 19 and the power receptacles 59, to the tool 1 (see FIGS. 8A-8B and 9A-9B). The leading edge of each of the power receptacles 59 may be beveled to facilitate alignment thereof with the power plugs 19.

Further, the power supply connection plate 12 of the support base 10 includes apertures 18 sized and positioned on the plate to receive the two or more alignment pins 58 of the tool support base 50 to facilitate alignment of the bases, allowing the power connectors to automatically engage. As herein described, the apertures like the pins 58 may be offset on the plate, and may have different lengths, to facilitate graduated alignment of the bases.

A rubberized flange may be added between the mounting surface of each plug and receptacle and their respective plates, to adjust for any slight deviation of misalignment due to wear over time. Furthermore, an O-ring seal may be positioned within the receptacle to prevent oil leaks. In embodiments where the tool is or includes a camera, a sensor or one or more similar devices, capable of gathering or receiving data or images, coaxial, Ethernet or similar connectors (with, for example, pin and socket contacts, respectively) may be positioned with the power plugs and receptacles on the bases, to facilitate data and image collection.

As shown in FIGS. 1-3, 8A, 8B, 9A, and 9B, the arm 3 includes a hose/cable track 2 supplying power from the power supply (e.g., compressor, pump and reservoir) and any communication wires. The power supply or multiple power supplies are typically housed on the equipment to which the extensible arm is attached. Tubes or hoses are provided from the power supply for hydraulics or pneumatics, and cables are provided for electrical power and data communication. One or more anchors 6 may be provided at various points of the members of the extensible, articulable or rotatable arm, to secure the hose/cable track holding the wires, tubing, hoses or other conduit of the power supply and the support base 10, and inhibit interference of the conduit with the articulation of the members, as shown for example in FIGS. 8A and 8B. The anchors may be tabs affixed by welding or otherwise to the arm members. Similarly, a bulkhead penetrator plate 62 may be provided to serve as a transition point from rigid tube/piping 2 to flexible hose, leading to the power plugs, as shown in FIG. 9B. The transition may be by penetrator fittings, and the bulkhead penetrator plate 62 may be secured to an anchor 6. This plate (and the associated fittings) acts as a strain relief so that when the arm is extending out, the hoses would be pulling on the penetrator fittings and not the power plugs.

As shown in FIGS. 9A, 9B and 10D, power is supplied to the power plugs 19 through conduit of the power supply 2, by means of a multi-valve manifold 17. Although four pairs of power receptacles and a similar number of power plugs are shown in the embodiments, and powered through the manifold, additional or fewer plug/receptacle pairs, which may vary by power type, may be positioned on either the support base 10 or the power receiving base 50, or both, as required for the tools intended to be used with the disclosed technology.

In practice of the disclosed technology, the support base 10 is affixed to the end of the extensible, articulable or rotatable arm 3, with the channel 11A aligned with an interior channel of the distal arm, as shown in FIGS. 5, and 6A-6E and 13. The power plugs 19 and the hydraulic cylinder of the unlock sleeve are then engaged with the power source 2, by wires or other means so that power may flow from the power source through the power plugs 19, and independently to the hydraulic cylinder 55B, 55C.

A tool 1 is secured to the tool support base 50, as shown in FIGS. 4 and 12A-12B and 13, with the load of the tool and the components directing spatial movement thereof engaged with the power receptacles 59, by conduits A, B, C and D, for example, or by other means so that power may flow through the receptacles to the components of the tool and related components directing spatial movement of the tool.

Through independent power and control, the arm 3 moves the support base 10 to the tool support base 50, and as shown in FIGS. 6A-6D and 10A, aligns the channel 11A with the alignment stab 51 of the tool support base (alternatively, the tool support base may be manually moved to the support base). As the power supply support base continues to move toward the tool support base (by extension of the arm), the channel 11A receives the alignment stab. As the alignment stab enters the channel, the alignment pins 58 are aligned with and received by the apertures 18 of the support base, causing the power connectors 59 and 19 to be aligned. Offsetting the alignment channels, and/or varying the length thereof (and the corresponding pins), facilitates a gradual alignment process.

As the alignment pins engage with and are received in the apertures 18, the rounded head 51B of the alignment stab makes contact with the spring loaded locking fingers 53. Further extension of the support base causes the shoulder of the alignment stab to compress the shoulder shock absorbers 52 as the rounded head of the alignment stab pushes past the spring loaded lock fingers, and the spring loaded locking fingers (by their spring force) are captured into the lock groove 51C, securing the head of the stab within channel. When the head of the stab is secured in the channel, the alignment pins are fully received by the corresponding apertures, and the power receptacles and plugs are engaged.

To disengage the tool, the unlock sleeve 55 encircling the spring loaded locking fingers is actuated (by means of a hydraulic cylinder, for example) to move along the length of the fingers, away from the support ring 54 (see FIGS. 6E and 10B); as it passes over the angled portion 53D of the fingers, it overcomes the spring tension of the spring 53C at the opposing end of each finger, thereby causing the tabs of the fingers to be removed from the groove. Once the tabs are removed from the groove, the base 50 (and tool 1 affixed thereto) is released from secured engagement with the base 10. By means of movement of the arm 3, the support base 10 may be retracted (causing disengagement of the bases 10, 50), repositioned and aligned to the next base 50, comprising a different tool, for engagement with the arm 3 and power source 2.

Tools suitable for use with the disclosed technology include (without limitation) augers, barrel grabbers, brush hogs, buckets, cameras, cleaners, crushers, drills, forks, grinders, hammers, high torque wrenches, jack hammers, lane barriers, lights, magnets, mine arches, pipe grabbers, rail road rail grabbers, rail road tie grabbers, saws, shears, spooler, spot drills, spreaders (jaws of life), tire handlers, tree shears, trenchers and various sensors. Tools will vary in power requirements, including types of power. Therefore, the power supply connection plate is intended to be designed for all (or most) tools anticipated for use with an extensible arm, providing all necessary types of power on the power receive plate, understanding that all connectors on the power supply connection plate may not be used with each tool. It is suggested that the power receive connection plates may be unique to each tool, with connectors only as necessary to satisfy the power needs of the tool (and any accompanying components directing the spatial position thereof), the connectors positioned to align with a similar type of connector on the power supply connection plate.

Recognizing that the power plugs and power receptacles hereinabove defined and positioned on the plates of the bases may be interchanged (with the plugs on the power supply base and the receptacles on the tool support base, instead of the opposite configuration as described), the claims hereinafter use the terms "connector" to define a power plug or power receptacle, thereby not limiting the claims or the invention herein described to the use of plugs solely on the tool support base (and receptacles solely on the power supply base). Notably, in furtherance of the intentions of the disclosed technology, the connectors are typically plug and jack connectors, allowing the connectors to engage by pushing one to the other, and not requiring any rotational movement of one connector relative to the other.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A common connection apparatus for coupling a power tool to an extensible arm and a power supply, comprising:
 a. a tool support base comprising a power receive connection plate with an exposed face, the power receive connection plate supporting
  i. an alignment stab,
  ii. a plurality of power connectors, and
  iii. two or more alignment pins,
  wherein the alignment stab extends from a first lateral portion of the exposed face of the power receive connection plate, and the power connectors and the alignment pins extend from an opposing lateral portion of the exposed face of the power receive connection plate;
 b. a power supply support base comprising:
  i. a stab receiver, the stab receiver being defined by a channel sized and shaped to receive and support the alignment stab when the tool support base is positioned for securement to the power supply support base; and
  ii. a power supply connection plate, positioned lateral to an exterior surface of a mouth of the stab receiver, and supporting a plurality of power connectors and having a plurality of apertures, each power connector of the power supply support base aligned to engage with the power connectors of the tool support base, and each aperture sized and positioned on the power supply connection plate to receive one of the alignment pins of the tool support base.

2. The common connection apparatus of claim 1, wherein
 a. the alignment stab comprises one or more lock grooves positioned about its circumference, and
 b. the power supply support base further includes a plurality of locking fingers positioned within the stab receiver to be received in the lock groove of the alignment stab when the alignment stab is fully positioned within the channel of the stab receiver.

3. The common connection apparatus of claim 2, wherein each locking finger comprises a bar and a tabbed end, the tabbed end extending inward from the bar towards a longitudinal axis of the channel, the tabbed end being sized and configured to be received and removably retained within the lock groove.

4. The common connection apparatus of claim 3, wherein each of the locking fingers further comprises a spring extending from the bar of the locking finger, to retain the tabs in the lock grooves.

5. The common connection apparatus of claim 2, wherein the power supply support base further comprises a support ring, the support ring pivotally supporting the locking fingers so that the locking fingers may pivot about the support ring, and wherein the support ring is positioned within the channel of the stab receiver so that the locking fingers are received and removably retained within the lock groove of the alignment stab.

6. The common connection apparatus of claim 5, wherein the locking fingers terminate with legs, the legs extending from the bars at an angle away from a central axis of the channel, and wherein the power supply support base further comprises an unlock sleeve, configured to move from a first position near the support ring to a second position distal to the support ring, wherein as the unlock sleeve moves to the second position it slides over the angled legs of the locking fingers, forcing the locking fingers to pivot about the support ring thereby removing the locking fingers from the lock groove of the alignment stab.

7. The common connection apparatus of claim 1, wherein movement of the unlock sleeve between the first and second positions is controlled by a hydraulic cylinder comprising a piston rod, wherein the unlock sleeve is affixed by webbing to a distal end of the piston rod.

8. The common connection apparatus of claim 1, wherein the alignment stab is an elongated element defined by a circular cross-sectional area, including a body having a shoulder near a distal end of the body, and terminating in a head, the head having a smaller cross-sectional area than the cross-sectional area of the body.

9. The common connection apparatus of claim 1, wherein the alignment pins are offset, and at least one alignment pin is longer than another of the alignment pins.

10. The common connection apparatus of claim 1, wherein the tool support base further includes two or more members, hingedly affixed together, with one member affixed to the power receive connection plate, to support and facilitate rotational movement of the power tool relative to the power receive connection plate.

11. The common connection apparatus of claim 1, further comprising a rotary actuator affixed to the power receive connection plate.

12. The common connection apparatus of claim 1, further comprising a linear actuator engaged with the power receive connection plate.

13. The common connection apparatus of claim 1, further comprising a slew drive engaged with the power receive connection plate.

14. The common connection apparatus of claim 1, wherein the alignment stab includes a spline along at least a portion of its length, and wherein the channel of the stab receiver comprises a groove sized and positioned to receive the spline of the alignment stab, facilitating alignment of the alignment stab within the channel.

15. The common connection apparatus of claim 1, wherein the stab receiver further includes one or more shoulder shock absorbers, each shoulder shock absorber including a guide affixed to a spring, the spring being affixed at its an opposing end thereof within the channel of the stab receiver, and wherein the stab receiver further comprises an internal collar affixed within the channel to secure and support the affixed end of the spring of the shoulder shock absorber.

16. The common connection apparatus of claim 15, wherein the guide is tapered inwardly towards a central axis of the channel.

17. The common connection apparatus of claim 1, wherein the power connectors are selected for suitability with power sources selected from the group consisting of hydraulic, pneumatic, electric, fiber optic and wireless power.

18. The common connection apparatus of claim 1, wherein the tool support base and the power supply base further support data connectors, the data connectors on the tool support base being positioned to align with the data connectors on the power supply base.

\* \* \* \* \*